United States Patent
Nakayama et al.

(10) Patent No.: US 8,349,451 B2
(45) Date of Patent: *Jan. 8, 2013

(54) CAPSULAR FINE PARTICLE COMPRISING OLEFINIC POLYMER

(75) Inventors: Yasushi Nakayama, Ichihara (JP); Naoto Matsukawa, Ichihara (JP); Junji Saito, Chiba (JP); Susumu Murata, Ichihara (JP); Makoto Mitani, Yokohama (JP); Terunori Fujita, Yokohama (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 245 days.

This patent is subject to a terminal disclaimer.

(21) Appl. No.: 11/887,928

(22) PCT Filed: Apr. 7, 2006

(86) PCT No.: PCT/JP2006/307497
§ 371 (c)(1),
(2), (4) Date: Oct. 5, 2007

(87) PCT Pub. No.: WO2006/109747
PCT Pub. Date: Oct. 19, 2006

(65) Prior Publication Data
US 2009/0098381 A1 Apr. 16, 2009

(30) Foreign Application Priority Data
Apr. 7, 2005 (JP) ................................. 2005-111257

(51) Int. Cl.
*B32B 15/02* (2006.01)
(52) U.S. Cl. .............. 428/402.22; 428/402; 428/402.21; 428/402.24; 264/4.1; 264/4.3

(58) Field of Classification Search .................. 428/402, 428/402.2, 402.21, 402.22; 430/106, 106.6, 430/137; 524/800, 801, 802; 424/423, 450, 424/489, 1; 526/307.5, 219.6, 227, 310, 526/319, 909
See application file for complete search history.

(56) References Cited

U.S. PATENT DOCUMENTS
| | | |
|---|---|---|
| 4,798,692 A | 1/1989 | Blersch et al. |
| 5,091,122 A | 2/1992 | Friend |

(Continued)

FOREIGN PATENT DOCUMENTS
| | | |
|---|---|---|
| JP | 02-002868 A | 1/1990 |

(Continued)

OTHER PUBLICATIONS
"Overview of Plastics Coating Technology", Industrial Technology Service Center Co., Ltd., 1989, pp. 251-293, with partial English translation.

(Continued)

*Primary Examiner* — James J Seidleck
*Assistant Examiner* — S. Camilla Pourbohloul
(74) *Attorney, Agent, or Firm* — Buchanan Ingersoll & Rooney PC

(57) ABSTRACT

To provide capsular fine particles comprising an olefinic polymer which have a uniform particle size distribution and a uniform particle size, and which are spherical and free from the coagulation between particles. Capsular fine particles comprising the olefinic polymer, of which the ratio (L/M) of the outer diameter (L) to the inner diameter (M) is 1.1 to 6.0, and the average diameter is 0.6 to 40 μm.

5 Claims, 2 Drawing Sheets

U.S. PATENT DOCUMENTS

| | | | | |
|---|---|---|---|---|
| 5,415,964 A | * | 5/1995 | Hayashi et al. | 430/137.17 |
| 5,651,796 A | | 7/1997 | Kubotani et al. | |
| 7,601,423 B2 | * | 10/2009 | Nakayama et al. | 428/402 |
| 2002/0068805 A1 | * | 6/2002 | Futami et al. | 526/307.5 |

FOREIGN PATENT DOCUMENTS

| | | | |
|---|---|---|---|
| JP | 05-317692 A | | 3/1993 |
| JP | 05-125127 A | | 5/1993 |
| JP | 2001-075510 | | 3/2001 |
| JP | 2001-139667 A | | 5/2001 |
| JP | 2002-513045 A | | 5/2002 |
| JP | 2004-190038 A | | 7/2004 |
| JP | 2004190038 A | * | 7/2004 |
| JP | 2004-190038 | * | 8/2004 |
| TW | 287116 | | 10/1996 |
| TW | 539572 | | 7/2003 |
| WO | WO 99/55454 A1 | | 11/1999 |

OTHER PUBLICATIONS

Office Action issued in corresponding Taiwanese Patent Application dated May 19, 2010.

Office Action from Chinese Patent Office issued in corresponding Chinese Patent Application No. 200680011377.0 dated Mar. 8, 2011.

"Application and Technology of Microcapsule," Guide to Chinese Poultry, 2003, pp. 25-27, vol. 20, No. 20, with a partial English translation.

D. Wang et al., "Application and Recent Progress of Microencapsulation," New Chemical Materials, 1999, pp. 11-14, vol. 27, No. 7, with an English abstract.

* cited by examiner

CAPSULAR FINE PARTICLE COMPRISING OLEFINIC POLYMER

TECHNICAL FIELD

The present invention relates to capsular fine particles comprising an olefinic polymer, which are suitable for various applications in high-performance materials.

BACKGROUND ART

A capsular particle is a particle comprising an outer layer and an inner layer, and has a cavity inside the inner layer and contains a gas, liquid or solid component in the cavity. Capsular particles are being used in various applications, since the particles exhibit characteristic properties as compared to conventional particles. Inter alia, capsular particles comprising a polymer component are anticipated as new high-performance materials.

Specifically, in the case of containing gas in the inner layer, the capsular particles realize whitening under light scattering and weight reduction as a material, and thus there is an on-going development of the material in applications such as pigment for coating material, solvent-based coating material, powdery coating material, weight-reducing resin material, hardware for electronic books, and the like. Furthermore, in the case when liquid or solid is encapsulated in the inner layer, the capsular particles realize the function of releasing the material in the inner layer under certain conditions, and thus there is an on-going development of the material in applications such as toner for dry process photocopiers, repellent for ants, heat storage medium, coating material, adhesive, agrochemical, feedstuff, and immobilized enzyme.

For the polymer which serves as the material for such capsular particles, an amorphous polymer such as polystyrene, polyvinyl chloride, polyacrylonitrile, polymethyl methacrylate or the like is used. However, these polymers have low solvent resistance and low heat resistance, and are difficult to handle as fine particles, and thus, their uses have been limited.

In an attempt to solve these problems, U.S. Pat. No. 4,798,691 discloses crosslinked type hollow polymer particles comprising a methyl methacrylate/divinylbenzene copolymer, but there has been a demand for capsular particles comprising a crystalline material having higher solvent resistance and higher heat resistance.

Polyolefin resins represented by polyethylene, polypropylene and the like, which are generally known as crystalline resins having excellent solvent resistance and heat resistance, are expected, due to their properties, to exhibit high performance as capsular particles, but could not be produced by conventional methods for preparing capsular particles. Thus, there has been a demand for capsular fine particles comprising a polyolefin as a novel high-performance material.

Furthermore, capsular fine particles may also be used after molding into a filter, a film or the like, and then functionalizing the surface by methods such as oxidative treatment with strong acid, plasma irradiation, electron beam irradiation, laser irradiation, UV irradiation and the like, and the methods are described in, for example, "Overview of Plastic Coating Technologies" (Industrial Technology Service Center Co., Ltd., p. 251 (1989)).

[Patent Document 1] U.S. Pat. No. 4,798,691
[Non-Patent Document 1] "Overview of Plastic Coating Technologies" (Industrial Technology Service Center Co., Ltd., p. 251 (1989))

DISCLOSURE OF THE INVENTION

Problems to be Solved by the Invention

The problems to be solved by the invention is to provide capsular fine particles comprising an olefinic polymer which have a uniform particle size distribution and a uniform particle size, and which are spherical and free from the coagulation between particles.

Means to Solve the Problems

The inventors of the present invention devotedly conducted an investigation to solve the above-described problems, and as a result, found that capsular fine particles comprising an olefinic polymer and having a specific particle size can be obtained by polymerizing an olefin in the presence of a polymerizing catalyst component comprising a specific solid catalyst component, an organometallic compound and the like, and removing the solid catalyst component from the resulting polymer, thus completing the invention.

Thus, the invention:

[1] provides capsular fine particles comprising an olefinic polymer;

[2] provides the capsular fine particles as described in [1] above, wherein the ratio (L/M) of the outer diameter (L) and the inner diameter (M) of the particle is 1.1 to 6.0, and the average particle size is 0.6 to 40 µm;

[3] provides the capsular fine particles as described in [1] or [2] above, wherein the olefinic polymer is a homopolymer or copolymer of an olefin having 2 to 20 carbon atoms;

[4] provides the capsular fine particles as described in [1] or [2] above, wherein the olefinic polymer is a homopolymer or copolymer of at least one monomer selected from linear or branched α-olefins having 2 to 6 carbon atoms, cyclic olefins, polar group-containing olefins, dienes, trienes and aromatic vinyl compounds;

[5] provides the capsular fine particles as described in [1] or [2] above, wherein the olefinic polymer comprises 95 to 100% by mole of a constituent unit derived from ethylene, propylene, 1-butene, 3-methyl-1-butene or 4-methyl-1-pentene, and 0 to 10% by mole of a constituent unit derived from at least one monomer selected from linear or branched α-olefins having 3 to 6 carbon atoms, other than ethylene, propylene, 1-butene, 3-methyl-1-butene and 4-methyl-1-pentene, cyclic olefins, polar group-containing olefins, dienes, trienes and aromatic vinyl compounds;

[6] provides the capsular fine particles comprising the olefinic polymer as described in any one of [1] to [5] above, wherein the olefinic polymer has one or more functional groups selected from a vinyl group, a vinylene group, a vinylidene group, an oxygen-containing group, a nitrogen-containing group, a boron-containing group, a sulfur-containing group, a phosphorus-containing group, a silicon-containing group, a germanium-containing group, a halogen-containing group and a tin-containing group, and wherein the infrared absorption spectrum obtained after methanol treatment is substantially identical to the infrared absorption spectrum obtained before methanol treatment;

[7] provides the capsular fine particles comprising the olefinic polymer as described in [6] above, wherein the number of the functional groups in the olefinic polymer is 0.01 to 20 per 1000 carbon atoms of the olefinic polymer;

[8] provides the capsular fine particles comprising the olefinic polymer as described in any one of [1] to [7] above, wherein the aspect ratio is 1.00 to 1.15; and

[9] provides the capsular fine particles comprising the olefinic polymer as described in any one of [1] to [8] above, wherein the encapsulated material is a gas, a liquid or a solid.

Effects of the Invention

The capsular fine particles comprising the olefinic polymer provided by the invention exhibit heat resistance, abrasion resistance, solvent resistance and high crystallinity that were not recognized from conventional capsular fine particle materials.

Furthermore, since the capsular fine particles comprising the olefinic polymer having functional groups attain adhesiveness, hydrophilicity, lipophilicity, water repellency, oil repellency, flowability and dyeability that are deficient in conventional materials, due to the functional groups introduced, the particles can be applied to various high-performance new materials.

BEST MODE FOR CARRYING OUT THE INVENTION

Figure 1:
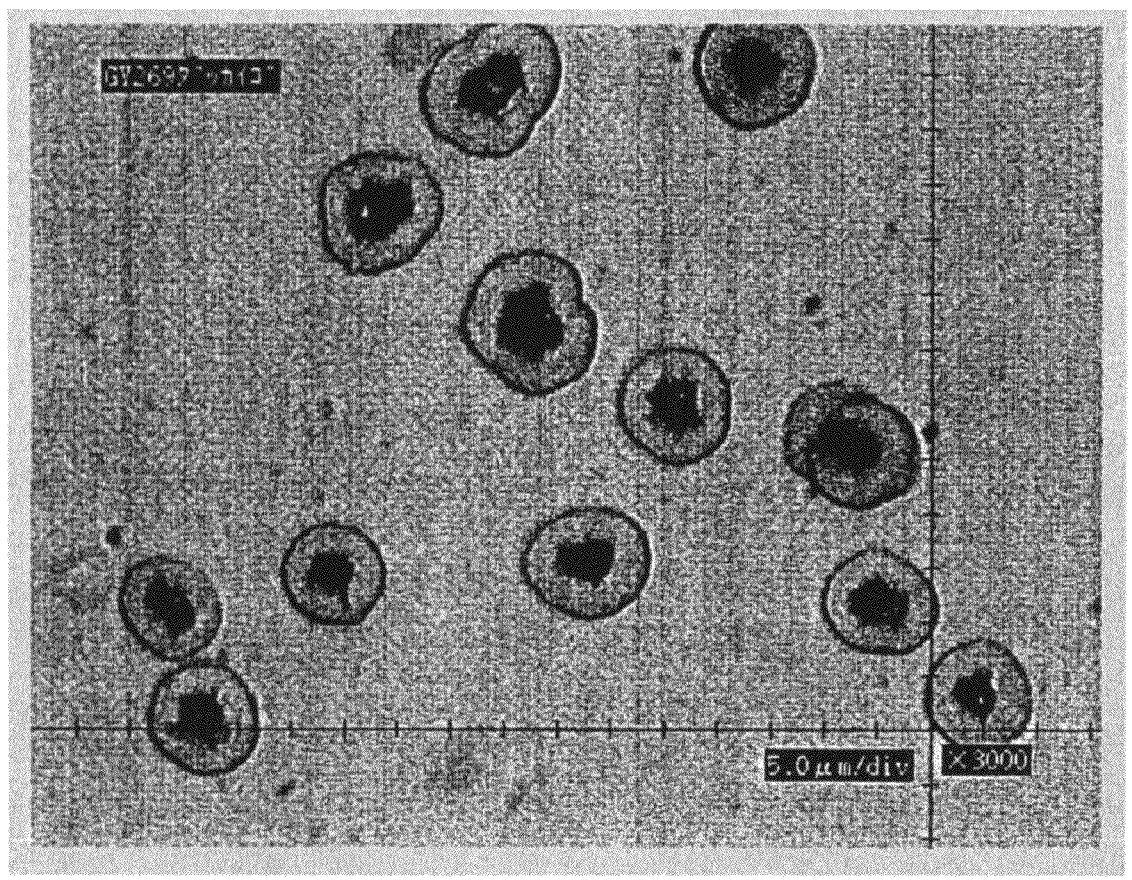
FIG. 1 shows an optical microscopic photograph obtained by Example 1.

Hereinafter, the capsular fine particles comprising the olefinic polymer according to the present invention will be explained in detail.

[Capsular Fine Particles Comprising Olefinic Polymer]

The capsular fine particles comprising the olefinic polymer of the invention are particles having a capsular structure composed of an olefinic polymer.

The capsular fine particles comprising the olefinic polymer of the present invention have an average particle size of 0.6 to 40 μm, and a ratio (L/M) of the outer diameter (L) and the inner diameter (M) of the particle of 1.1 to 6.0, and the particles comprise a crystalline olefinic polymer.

The crystalline olefinic polymer composing the capsular fine particles comprising the olefinic polymer of the invention is a homopolymer or copolymer of an olefin having 2 to 20 carbon atoms.

Specifically, polyolefins such as polyethylene, polypropylene, polybutene, poly-3-methyl-1-butene, poly-4-methyl-1-pentene may be mentioned, and preferably polyethylene, polypropylene and poly-4-methyl-1-pentene may be mentioned. The olefinic polymer may be a homopolymer of a single olefinic monomer, or may be a copolymer containing 0.01 to 10% by mole of another olefinic monomer.

Here, the another olefinic monomer may be exemplified by ethylene, an α-olefin, a cyclic olefin, a polar group-containing olefin, a diene, a triene, an aromatic vinyl compound.

Specifically, the α-olefin may be exemplified by propylene, 1-butene, 3-methyl-1-butene, 1-pentene, 1-hexene, 4-methyl-1-pentene, 3-methyl-1-pentene, 1-octene, 1-decene, 1-tetradecene, 1-hexadecene, 1-octadecene and 1-eicosene, and among these, propylene, 1-butene, 4-methyl-1-pentene, 1-hexene, 1-octene and 1-decene are particularly preferred.

The cyclic olefin may be exemplified by cyclopentene, cyclohexene, cycloheptene, norbornene, 5-methyl-2-norbornene, tetracyclododecene and 2-methyl-1,4,5,8-dimethano-1,2,3,4,4a,5,8,8a-octahydronaphthalene.

The polar group-containing olefin may include α,β-unsaturated carboxylic acids such as acrylic acid, methacrylic acid, fumaric acid, maleic anhydride, itaconic acid, itaconic anhydride and bicyclo(2,2,1)-5-heptene-2,3-dicarboxylic acid anhydride, and α,β-unsaturated carboxylic acid metal salts such as sodium salts, potassium salts, lithium salts, zinc salts, magnesium salts, and calcium salts of the above-mentioned acids; α,β-unsaturated carboxylic acid esters such as methyl acrylate, ethyl acrylate, n-propyl acrylate, isopropyl acrylate, n-butyl acrylate, isobutyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate; vinyl esters such as vinyl acetate, vinyl propionate, vinyl caproate, vinyl caprate, vinyl laurate, vinyl stearate and vinyl trifluoroacetate; unsaturated glycidyl such as glycidyl acrylate, glycidyl methacrylate and itaconic acid monoglycidyl ester.

The diene and triene may be exemplified by butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, 5-ethylidene-2-norbornene, 5-vinyl-2-norbornene and dicyclopentadiene; 7-methyl-1,6-octadiene, 4-ethylidene-8-methyl-1,7-nonadiene and 5,9-dimethyl-1,4,8-decatriene.

Examples of the aromatic vinyl compound include mono- or polyalkylstyrenes such as styrene, o-methylstyrene, m-methylstyrene, p-methylstyrene, o,p-dimethylstyrene, o-ethylstyrene, m-ethylstyrene and p-ethylstyrene; functional group-containing styrene derivatives such as methoxystyrene, ethoxystyrene, vinylbenzoic acid, methyl vinylbenzoate, vinylbenzylacetate, hydroxystyrene, o-chlorostyrene, p-chlorostyrene and divinylbenzene; 3-phenylpropylene, 4-phenylpropylene and α-methylstyrene, and among these, one or two or more species are used.

The outer diameter (L), inner diameter (M), average particle size and aspect ratio of the capsular fine particles comprising the olefinic polymer of the invention can be calculated by an optical image analysis using two-dimensional image data taken by an optical microscope.

In the case of capsular fine particles comprising the olefinic polymer of the invention, the inner layer disposed on the inner side of the olefinic polymer which constitutes the outer layer of the fine particle comprises a gas, a liquid or a solid. That is, since the inner layer is charged with a material that is different from the material of the outer layer, the refractive index of the inner layer is different from that of the outer layer, and thus, it is possible to directly observe the inner layer part with an optical microscope. Therefore, a dry powder of the produced capsular fine particles comprising the olefinic polymer is photographed under a microscope, and using the image data, the inner diameter (M) and the outer diameter (L) were calculated as circle equivalent diameters.

The circle equivalent diameter is a diameter of a true circle, which is drawn to have a perimeter corresponding to the measured perimeter obtained by measuring a perimeter of a particle from the obtained two-dimensional image data.

Furthermore, the average particle size of the capsular fine particles according to the invention has the same meaning as the outer diameter (L).

The aspect ratio can be calculated from the ratio (Le/Li) of the diameter of a circle circumscribing the particle (Le) and the diameter of a circle inscribing the particle (Li), based on the two-dimensional image of the fine particles obtained in the same manner as described above. As the ratio (Le)/(Li) approaches 1, it means that the fine particle is close to a true sphere.

The average particle size of the capsular fine particles comprising the olefinic polymer of the invention thus determined is 0.6 to 40 µm, preferably 1 to 25 µm, and more preferably 2 to 15 µm.

The ratio (L/M) of the outer diameter (L) and the inner diameter (M) of the particle is 1.1 to 6.0, preferably 1.2 to 5.0, and more preferably 1.5 to 4.0.

The capsular fine particles comprising the olefinic polymer of the invention is obtained by removing a solid catalyst component as will be described later. As polymerization of a small amount of olefin is conducted in the presence of a specific polymerizing catalyst, the solid catalyst component is not broke apart and remains in the polymer while keeping the original form of the solid catalyst component. Because of this, the inner diameter of the capsular fine particle can be controlled by the particle size of the solid catalyst component, and the outer diameter can be controlled by the amount of polymerization of olefin. Thus, capsular fine particles having the desired average particle size and the ratio L/M can be obtained.

Furthermore, the capsular fine particles comprising the olefinic polymer of the invention has an intrinsic viscosity [η] of 0.1 to 50 dl/g, and preferably 0.15 to 50 dl/g, and a melting point (Tm) of 100° C. to 300° C., even though the melting point would vary depending on the purpose of use or on the kind of olefin used in polymerization.

The encapsulated material of the capsular fine particles comprising the olefinic polymer of the invention is composed of a gas, a liquid or a solid inorganic material or organic material, and specific examples of such gas include air, nitrogen, argon and carbon dioxide. The liquid or the solid organic material may be exemplified by an oxygen-containing compound such as an alcohol compound, an ether compound, an epoxy compound, a carbonyl group-containing compound and an epoxy compound; a nitrogen-containing compound such as an amino compound and an amide compound; a sulfur-containing compound such as a thiol compound and a thioester compound. The material may be a monomeric compound or a polymeric compound, and aromatic vinyl compounds such as styrene and vinylstyrene, and polymers thereof can also be mentioned as examples.

[Method for Producing Capsular Fine Particles Comprising Olefinic Polymer]

In the following, a method for producing capsular fine particles comprising the olefinic polymer will be described.

The capsular fine particles comprising the olefinic polymer of the invention are produced by [Process 1] in which the olefin as described above is polymerized in the presence of a specific solid catalyst component for olefin polymerization to produce fine particles comprising an olefinic polymer; [Process 2] in which the solid catalyst component forming the inner layer that is disposed on the inner side of the olefinic polymer, which is the outer layer, is removed from the produced fine particles comprising the olefinic polymer; and [Process 3] in which a gas, a liquid, or a solid inorganic material or organic material is introduced as the encapsulated material, as needed, into the inner layer part obtained by removing the solid catalyst component. Hereinafter, the respective processes will be explained.

[Process 1]

Process 1 is a process for producing fine particles comprising an olefinic polymer by polymerizing the olefin described above in the presence of a specific solid catalyst component for olefin polymerization. The specific solid catalyst component for olefin polymerization according to the invention contains a magnesium-containing support component that will be described later. Such solid catalyst component for olefin polymerization is a solid catalyst component having (A) a magnesium-containing support component that will be described later, and (B) a transition metal compound or (C) a liquid titanium compound supported thereon. The olefinic monomer can be homopolymerized or copolymerized in the presence of a polymerizing catalyst component composed of the solid catalyst component described above, and (D) an organometallic compound, and if desired, (E) an anionic surfactant.

Hereinafter, the solid catalyst component used in the invention will be first described.

The term "supporting" as used in the invention refers to the state in which the dissolved portion of the transition metal compound (B) or the liquid titanium compound (C) in at least one solvent selected from hexane, decane and toluene is respectively 1% by weight or less, even after stirring at normal pressure and at room temperature for 1 minute to 1 hour.

The magnesium-containing support component (A) (hereinafter, may be simply referred to as "support" or "support component") according to the invention contains all of a magnesium atom, an aluminum atom and an alkoxy group having 1 to 20 carbon atom(s), is not soluble in hydrocarbon solvents, and has an average particle size in the range of 0.1 to 10.0 µm, preferably 0.5 to 8.0 µm, and more preferably 0.5 to 6.0 µm.

The support component of the invention is obtained by contacting magnesium halide with an alcohol having 1 to 20 carbon atom(s) or a phenol compound (hereinafter, this contacting may be referred to as "first contacting"), and then contacting the resulting product with an organoaluminum compound (hereinafter, this contacting may be referred to as "second contacting") under specific conditions.

As the magnesium halide, magnesium chloride or magnesium bromide is preferably used. Such magnesium halide may be commercially available products that are directly used, or may be separately prepared from alkylmagnesium, and in the latter case, magnesium halide can also be used without isolating.

The alcohol having 1 to 20 carbon atom(s) may be exemplified by alcohols corresponding to the above-described alkoxy group having 1 to 20 carbon atom(s), and examples thereof include methanol, ethanol, n-propanol, i-propanol, n-butanol, i-butanol, t-butanol, n-pentanol, i-amyl alcohol, n-hexanol, n-heptanol, 2-ethylhexanol, n-octanol, dodecanol, octadecyl alcohol, oleyl alcohol, benzyl alcohol, phenylethanol, cumyl alcohol and i-propylbenzyl alcohol. Furthermore, halogen-containing alcohols such as trichloromethanol, trichloroethanol and trichlorohexanol can also be mentioned. Phenol, or a lower alkyl group-containing phenol such as cresol, ethylphenol, nonylphenol, cumylphenol and naphthol may exemplify the phenol compound. Among these, methanol, ethanol, propanol, butanol, pentanol, i-amyl alcohol, hexanol, heptanol, 2-ethylhexanol, octanol and dodecanol are preferred.

In the case of contacting magnesium halide with an alcohol having 1 to 20 carbon atom(s) or a phenol compound, the contacting may be performed in the presence of a solvent. The solvent may be exemplified by an aliphatic hydrocarbon such as hexane, heptane, octane, decane, dodecane and kerosene; an alicyclic hydrocarbon such as cyclopentane, cyclohexane and methylcyclopentane; an aromatic hydrocarbon such as benzene, toluene and xylene; a halogenated hydrocarbon such as ethylene dichloride, chlorobenzene and dichloromethane; and mixtures thereof.

The contacting is usually performed under heating. In the case of heating, the temperature can be arbitrarily selected from a temperature range up to the boiling point of the solvent used. The contacting time may vary depending on the contacting temperature, but under the conditions of using, for example, n-decane as the solvent, and at a heating temperature of 130° C., contacting for about 4 hours results in homogenization of the content material, and this serves as the reference state of completion of the contacting. The contacting is typically performed with the use of an apparatus facilitating the contacting by stirring or the like. During the initiation of the contacting, the solvent and the content material are usually inhomogeneous; however, as the contacting proceeds, the solvent and the content material are gradually homogenized, and finally liquefied.

The support component of the invention is more preferably prepared by a method of preparation comprising a process complete liquefaction of the support component from the viewpoint of powder properties of the produced fine particles comprising the olefinic polymer.

The contacting product of magnesium halide with an alcohol having 1 to 20 carbon atom(s) or a phenol compound thus prepared (hereinafter, may be referred to as "first contacting product") may be used after removing the solvent used during the contacting, or may be used without distilling the solvent off. Typically, the contacting product is supplied to the process of the next stage without distilling the solvent off.

The first contacting product obtained by the method described above is subsequently contacted with an organoaluminum compound represented by the following general formula (1) under specific conditions (=second contacting).

$$AlR_nX_{3-n} \qquad (1)$$

In the general formula (1), R represents a hydrocarbon group having 1 to 20 carbon atom(s), and may be specifically exemplified by a methyl group, an ethyl group, a propyl group, a butyl group, a hexyl group, an octyl group and a decyl group. X represents a halogen atom such as a chlorine atom and a bromine atom, or a hydrogen atom. The letter n represents a real number from 1 to 3, and is preferably 2 or 3. If R is present in plurality, the plurality of R may be identical or different, and if X is present in plurality, the plurality of X may be identical or different. For the organoaluminum compound, specifically the following compounds are used. The organoaluminum compounds satisfying such requirements may be exemplified by a trialkylaluminum such as trimethylaluminum, triethylaluminum, triisopropylaluminum, triisobutylaluminum, trioctylaluminum and tri-2-ethylhexylaluminum; an alkenylaluminum such as isoprenylaluminum; a dialkylaluminum halide such as dimethylaluminum chloride, diethylaluminum chloride, diisopropylaluminum chloride, diisobutylaluminum chloride and dimethylaluminum bromide; an alkylaluminum sesquihalide such as methylaluminum sesquichloride, ethylaluminum sesquichloride, isopropylaluminum sesquichloride, butylaluminum sesquichloride and ethylaluminum sesquibromide; an alkylaluminum dihalide such as methylaluminum dichloride, ethylaluminum dichloride, isopropylaluminum dichloride and ethylaluminum dibromide; an alkylaluminum hydride such as diethylaluminum hydride and diisobutylaluminum hydride. Among these, trimethylaluminum, triethylaluminum, triisobutylaluminum, trihexylaluminum, trioctylaluminum, diethylaluminum chloride, ethylaluminum sesquichloride, ethylaluminum dichloride and diisobutylaluminum hydride are preferred.

This second contacting is specifically performed by a method of adding the organoaluminum compound represented by the general formula (1) to the first contacting product, while mixing the first contacting product at a high speed under high shear force. The apparatus for mixing the first contacting product at a high speed is not particularly limited as long as any machine that is commercially available as an emulsifying machine or a dispersing machine is used, and there may be mentioned, for example, a batch-type emulsifying machine such as ULTRA TURRAX (manufactured by IKA Corp.), Polytron (manufactured by Kinematica AG), T.K. AUTO HOMO MIXER (manufactured by Tokushu Kika Kogyo Co., Ltd.), TK Neo Mixer (manufactured by Tokushu Kika Kogyo Co., Ltd.), National Cooking Mixer (manufactured by Matsushita Electric Industrial Co., Ltd.); a continuous type emulsifying machine such as Ebara milder (manufactured by Ebara Corp.), TK PIPELINE HOMO MIXER, TK HOMOMIC LINE FLOW (manufactured by Tokushu Kika Kogyo Co., Ltd.), colloid mill (manufactured by Nippon Seiki Co., Ltd.), slasher, Trigonal wet micropulverizer (manufactured by MITSUI MIIKE KAKOKI K.K.), CAVITRON (manufactured by EUROTEC. LTD.) and fine flow mill (manufactured by Pacific Machinery & Engineering Co., Ltd.); an emulsifying machine of batch-and-continuous combined type such as Clear Mix (manufactured by M Technology, Inc.) and FILMIX (manufactured by Tokushu Kika Kogyo Co., Ltd.); a high pressure emulsifying machine such as Microfluidizer (manufactured by MIZUHO Industrial Co., Ltd.), Nanomaker, Nanomizer (manufactured by Nanomizer, Inc.) and APV Gaulin (manufactured by Gaulin, Inc.); a membrane emulsifying machine such as membrane emulsifying machine (manufactured by IPROS Corp.); a vibration type emulsifying machine such as Vibro-mixer (manufactured by IPROS Corp.); and an ultrasonic emulsifying machine such as Ultrasonic Homogenizer (manufactured by BRANSON Ultrasonics Corp.).

During the second contacting, the first contacting product is preferably in a state of being diluted in a solvent, and such solvent can be used without particularly limitation, as long as the solvent is a hydrocarbon not carrying any active hydrogen. However, typically it is efficient to use the solvent that has been used during the first contacting, without distilling the solvent off, directly as the solvent during the second contacting. The organoaluminum compound to be added to the first contacting product may be used after being diluted in a solvent, or may be added without diluting in a solvent, but the compound is typically used in a state of being diluted in an aliphatic saturated hydrocarbon such as n-decane or n-hexane, or in an aromatic hydrocarbon solvent such as toluene or xylene. Upon addition, the organoaluminum compound is usually added to the first contacting product over 5 minutes to 5 hours. If the capacity for heat removal in the contacting system is sufficient, the addition can be completed within a short time; however, if the capacity for heat removal is insufficient, it is desirable to perform the addition over a long time. The addition of the organoaluminum compound may be performed at once, or may be performed in several divided portions. In the case of performing the addition in divided portions, the organoaluminum compound in the respective portions to be added may be identical or different, and the temperature of the first contacting product may be identical or different in the respective additions.

During the second contacting, use amount of the organoaluminum compound represented by the general formula (1) is, in terms of aluminum atoms, 0.1- to 50-fold by moles, preferably 0.5- to 30-fold by moles, more preferably 1.0- to 20-fold by moles, further preferably 1.5- to 15-fold by moles, and particularly 2.0- to 10-fold by moles, relative to the amount of magnesium atoms in the first contacting product.

Among the methods of preparing the support by the second contacting, a particularly preferred form of the second contacting will be described in the following.

During contacting the first contacting product with the organoaluminum compound represented by Formula (1), it is preferable to use a means involving a reaction between two liquid products, such as in, for example, contacting a hydrocarbon-diluted solution of a magnesium compound with an organoaluminum compound diluted in a hydrocarbon solvent, or the like. The use amount of the organoaluminum compound in this case may vary depending on the kind of the compound and the contacting conditions, but typically the amount is preferably 2 to 10 moles relative to 1 mole of the magnesium compound. The solid product varies in the shape, size or the like depending on the conditions for formation. In order to obtain a solid product having uniform shape and particle size, it is preferable to avoid a rapid particle forming reaction, while maintaining high shear and high speed mixing as described above, and for example, in the case of forming a solid product by contacting and mixing the magnesium compound and the organoaluminum compound in their respective liquid states, and forming a solid product by a mutual reaction, it is desirable to mix both compounds at a low temperature where rapid solid generation by the contacting does not occur, and then increasing the temperature to gradually form a solid product. According to this method, it is easy to control the particle size in the microparticulate region of the solid product, and a microparticulate, spherical solid product having a very narrow particle size distribution can be easily obtained.

With regard to the transition metal compounds (B) and (C) used in producing the capsular fine particles comprising the olefinic polymer of the invention, there is no particularly limitation, but for example, the transition metal compounds disclosed in the following literatures can be used without limitation:

(1) JP-A No. H11-315109, (2) JP-A No. 2000-239312, (3) EP-1008595, (4) WO 01/55213, (5) JP-A No. 2001-2731, (6) EP-1043341, (7) WO 98/27124, (8) Chemical Review, 103, 283 (2003), (9) Bulletin of the Chemical Society of Japan, 76, 1493 (2003), (10) Angewandte Chemie, International Edition, English, 34 (1995) and (11) Chemical Review, 8, 2587 (1998).

To support the transition metal compound (B) on the magnesium-containing support component (A) of the invention, the magnesium-containing support component (A) and the transition metal compound (B) may be mixed with stirring in an inert solvent for a predetermined time, and then filtered. In this case, a heating operation may also be carried out. The inert solvent may be exemplified by an aromatic hydrocarbon such as benzene, toluene and xylene; an aliphatic saturated hydrocarbon such as hexane, heptane and decane; an alicyclic hydrocarbon such as cyclohexane and methylcyclopentane; a halogenated hydrocarbon such as ethylene chloride, chlorobenzene and dichloromethane; and mixture thereof. In the case of heating, the temperature may vary depending on the solvent used, but typically the temperature is ranging from a temperature of the freezing point of the solvent to 200° C., and preferably up to 150° C. The time for mixing with stirring may vary depending on the temperature, but typically the time is ranging from 30 seconds to 24 hours, and preferably from 10 minutes to 10 hours. Filtration can be performed by employing a filtering method conventionally used in the field of organic synthetic chemistry. The cake component obtained after filtration may be washed, if necessary, with an aromatic hydrocarbon or an aliphatic hydrocarbon mentioned in the above.

In addition, the liquid titanium compound (C) that is used in the preparation of the solid catalyst component using the magnesium-containing support component (A) of the invention may be specifically exemplified by a tetravalent titanium compound represented by the following general formula (2):

$$Ti(OR)_nX_{4-n} \quad (2)$$

wherein R represents a hydrocarbon group; X represents a halogen atom; and n is an integer of $0 \leq n \leq 4$.

Specific examples of such titanium compound include tetrahalogenated titanium such as $TiCl_4$, $TiBr_4$ and $TiI_4$; trihalogenated alkoxytitanium such as $Ti(OCH_3)Cl_3$, $Ti(OC_2H_5)Cl_3$, $Ti(O\text{-}n\text{-}C_4H_9)Cl_3$, $Ti(OC_2H_5)Br_3$ and $Ti(O\text{-}iso\text{-}C_4H_9)Br_3$; dihalogenated dialkoxytitanium such as $Ti(OCH_3)_2Cl_2$ $Ti(OC_2H_5)_2Cl_2$, $Ti(O\text{-}n\text{-}C_4H_9)_2Cl_2$ and $Ti(OC_2H_5)_2Br_2$; monohalogenated trialkoxytitanium such as $Ti(OCH_3)_3Cl$, $Ti(OC_2H_5)_3Cl$, $Ti(O\text{-}n\text{-}C_4H_9)_3Cl$ and $Ti(OC_2H_5)_3Br$; tetraalkoxytitanium such as $Ti(OCH_3)_4$, $Ti(OC_2H_5)_4$, $Ti(O\text{-}n\text{-}C_4H_9)_4$, $Ti(O\text{-}iso\text{-}C_4H_9)_4$ and $Ti(O\text{-}2\text{-}ethylhexyl)_4$.

Among these, halogen-containing titanium compounds are preferred, and tetrahalogenated titanium compounds are preferred, with titanium tetrachloride being particularly preferred. These titanium compounds may be used individually or may be used in combination of two or more species. Also, these titanium compounds may be diluted in a hydrocarbon compound, a halogenated hydrocarbon compound or the like.

When supporting the liquid titanium compound (C) on the magnesium-containing support component (A) of the invention, the magnesium-containing support component (A) and the liquid titanium compound (C) are mixed with stirring for a predetermined time by at least one method selected from (i) a method of contacting the components in a suspended state in the co-presence of an inert solvent, and (ii) a method of contacting the components several times in divided portions, and the mixture is filtered. In this case, a heating operation may be carried out. The inert solvent may be exemplified by an aromatic hydrocarbon such as benzene, toluene and xylene; an aliphatic saturated hydrocarbon such as hexane, heptane and decane; an alicyclic hydrocarbon such as cyclohexane and methylcyclopentane; a halogenated hydrocarbon such as ethylene chloride, chlorobenzene and dichloromethane; or mixtures thereof. In the case of heating, the temperature may vary depending on the solvent used, but typically the temperature is ranging from a temperature of the freezing point of the solvent to 200° C., and preferably up to 150° C. The time for mixing with stirring may vary depending on the temperature, but typically the time is ranging from 30 seconds to 24 hours, and preferably from 10 minutes to 10 hours. Filtration can be performed by employing a filtering method conventionally used in the field of organic synthetic chemistry. The cake component obtained after filtration may be washed, if necessary, with an aromatic hydrocarbon or an aliphatic hydrocarbon mentioned in the above.

Furthermore, when preparing the solid catalyst component, an electron donor can be used, according to necessity. The electron donor may be exemplified by alcohols, phenols, ketones, aldehydes, carboxylic acids, acid halides, esters of organic acids or inorganic acids, ethers, acid amides, acid anhydrides, ammonia, amines, nitriles, isocyanates, nitrogen-containing cyclic compounds and oxygen-containing cyclic compounds.

More specifically, there may be mentioned alcohols having 1 to 18 carbon atom(s), such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol; halogen-containing alcohols having 1 to 18 carbon atom(s), such as trichloromethanol, trichloroethanol and trichlorohexanol; phenols having 6 to 20 carbon atoms, which may have a lower alkyl group, such as phenol, cresol, xylenol, ethylphenol, propylphenol, nonylphenol, cumylphenol and naphthol; ketones having 3 to 15 carbon atoms, such as accetone, methyl ethyl ketone, methyl isobutyl ketone, acetophenone, benzophenone and benzoquinone; aldehydes having 2 to 15 carbon atoms, such as acetoaldehyde, propionaldehyde, octyl aldehyde, benzaldehyde, tolualdehyde and naphthoaldehyde; organic acid esters having 2 to 30 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, coumarin, phthalide and ethyl carbonate; acid halides having 2 to 15 carbon atoms, such as acetyl chloride, benzoyl chloride, toluic acid chloride and anisic acid chloride; ethers having 2 to 20 carbon atoms, such as methyl ether, ethyl ether, isopropyl ether, butyl ether, amyl ether, tetrahydrofuran, anisole and diphenyl ether; acid amides such as acetic acid N,N-dimethyl amide, benzoic acid N,N-diethyl amide and toluic acid N,N-dimethyl amide; amines such as methylamine, ethylamine, dimethylamine, diethylamine, trimethylamine, triethylamine, tributylamine, tribenzylamine, tetramethylenediamine and hexamethylenediamine; nitriles such as acetonitrile, benzonitrile and trinitrile; acid anhydrides such as acetic anhydride, phthalic anhydride and benzoic anhydride; pyrroles such as pyrrole, methylpyrrole and dimethylpyrrole; pyrroline; pyrrolidine; indole; pyridines such as pyridine, methylpyridine, ethylpyridine, propylpyridine, dimethylpyridine, ethylmethylpyridine, trimethylpyridine, phenylpyridine, benzylpyridine and pyridine chloride; nitrogen-containing cyclic compounds such as piperidines, quinolines and isoquinolines; oxygen-containing cyclic compounds such as tetrahydrofuran, 1,4-cineole, 1,8-cineole, pinolfuran, methylfuran, dimethylfuran, diphenylfuran, benzofuran, coumaran, phthalan, tetrahydropyran, pyran and dihydropyran.

As the organic acid ester, polyvalent carboxylic acid esters having a molecular skeleton represented by the following general formulae (3) may be mentioned as particularly preferred examples.

[Chem. 1]

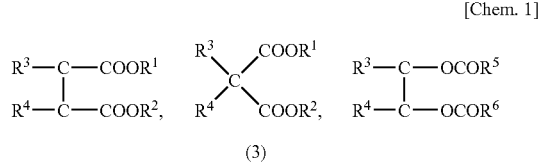

(3)

In the above formulae, $R^1$ represents a substituted or unsubstituted hydrocarbon group; $R^2$, $R^5$ and $R^6$ each represent a hydrogen atom, or a substituted or unsubstituted hydrocarbon group; and $R^3$ and $R^4$ each represent a hydrogen atom or a substituted or unsubstituted hydrocarbon group, with at least one of them being preferably a substituted or unsubstituted hydrocarbon group. $R^3$ and $R^4$ may also be linked to each other to form a cyclic structure. In the case where the hydrocarbon groups $R^1$ to $R^6$ are substituted, the substituent groups contain heteroatom such as N, O or S, and have groups such as, for example, C—O—C, COOR, COOH, OH, $SO_3H$, —C—N—C— and $NH_2$.

Specific examples of such polyvalent carboxylic acid ester include aliphatic polycarboxylic acid esters such as diethyl succinate, dibutyl succinate, diethyl methylsuccinate, diisobutyl α-methylglutarate, diethyl methylmalonate, diethyl ethylmalonate, diethyl isopropylmalonate, diethyl butylmalonate, diethyl phenylmalonate, diethyl diethylmalonate, diethyl dibutylmalonate, monooctyl maleate, dioctyl maleate, dibutyl maleate, dibutyl butylmaleate, diethyl butylmaleate, diisopropyl β-methylglutarate, diallyl ethylsuccinate, di-2-ethylhexyl fumarate, diethyl itaconate and dioctyl citraconate; alicyclic polycarboxylic acid esters such as diethyl 1,2-cyclohexanecarboxylate, diisobutyl 1,2-cyclohexanecarboxylate, diethyl tetrahydrophthalate and diethyl ester of nadic acid; aromatic polycarboxylic acid esters such as monoethyl phthalate, dimethyl phthalate, methyl ethyl phthalate, monoisobutyl phthalate, diethyl phthalate, ethyl isobutyl phthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzyl butyl phthalate, diphenyl phthalate, diethyl naphthalenedicarboxylate, dibutyl naphthalenedicarboxylate, triethyl trimellitate and dibutyl trimellitate; and heterocyclic polycarboxylic acid esters such as 3,4-furan dicarboxylate.

Furthermore, as other examples of the polyvalent carboxylic acid ester, there may be mentioned esters of long-chain dicarboxylic acids, such as diethyl adipate, diisobutyl adipate, diisopropyl sebacate, di-n-butyl sebacate, di-n-octyl sebacate and di-2-ethylhexyl sebacate.

According to the invention, organosilicon compounds represented by the following general formula (4-1) or (4-3), polyether compounds represented by the following general formula (5) may also be used as the electron donor.

$$R^p_n\text{—Si—}(OR^q)_{4-n} \quad (4\text{-}1)$$

wherein n is 1, 2 or 3; when n is 1, $R^p$ represents a secondary or tertiary hydrocarbon group, and when n is 2 or 3, at least one of $R^p$ represents a secondary or tertiary hydrocarbon group, with the others representing hydrocarbon groups, while the plurality of $R^p$ may be identical or different; and $R^q$ is a hydrocarbon group having 1 to 4 carbon atom(s), and when 4-n is 2 or 3, $R^q$ may be identical with or different from each other.

In the silicon compounds represented by the formula (4-1), the secondary or tertiary hydrocarbon group may be exemplified by a cyclopentyl group, a cyclopentenyl group, a cyclopentadienyl group, the same groups having substituents, or a hydrocarbon group in which the carbon adjacent to Si is secondary or tertiary.

Among these, dimethoxysilanes, and particularly dimethoxysilanes represented by the following general formula (4-2), are preferred.

[Chem. 2]

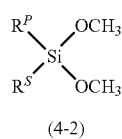

(4-2)

Wherein $R^p$ and $R^s$ each independently represent a cyclopentyl group, a substituted cyclopentyl group, a cyclopentenyl group, a substituted cyclopentenyl group, a cyclopentadienyl group, a substituted cyclopentadienyl group, or a hydrocarbon group in which the carbon adjacent to Si is a secondary carbon or a tertiary carbon.

The organosilicon compound represented by the general formula (4-2) may be specifically exemplified by dicyclopentyldimethoxysilane, di-t-butylmethoxysilane, di(2-methylcyclopentyl)dimethoxysilane, di(3-methylcyclopentyl)dimethoxysilane and di-t-amyldimethoxysilane.

For the organosilicon compounds, organosilicon compounds represented by the following general formula (4-3) can also be used.

$$R_n\text{—Si—}(OR')_{4-n} \quad (4\text{-}3)$$

wherein R and R' are each a hydrocarbon group such as alkyl groups, aryl groups and alkylidene groups and n is an integer of $0 \leq n \leq 4$.

The organosilicon compounds represented by such general formula (4-3) may be specifically exemplified by diphenyldimethoxysilane, diisopropyldimethoxysilane, di-n-propyldimethoxysilane, vinyltrimethoxysilane, vinyltriethoxysilane, phenyltriethoxysilane and n-propyltriethoxysilane.

Furthermore, as compounds which are similar to the organosilicon compounds represented by the general formula (4-3), γ-chloropropyltrimethoxysilane, γ-aminopropyltriethoxysilane, chlorotriethoxysilane, ethyl silicate, butyl silicate, vinyltris(β-methoxyethoxysilane), vinyltriacetoxysilane and dimethyltetraethoxysilane may also be mentioned.

The organosilicon compounds represented by the general formula (4-3) may include the organosilicon compounds represented by the general formula (4-1). The organosilicon compounds can be used individually or in combination of two or more species.

Polyether compounds are compounds, which have two or more ether bonds with a plurality of atoms intercepting between the bonds, and have a plurality of atoms disposed between at least two ether bonds (C—O—C) (that is between C—O—C and C—O—C). Specifically, compounds in which at least two ether bonds (C—O—C) are linked though a plurality of atoms that are disposed therebetween, and this plurality of atoms are carbon, silicon, oxygen, sulfur, phosphorus, boron, or two or more kinds selected from these may be mentioned.

Also, the atoms linking these ether bonds may have a substituent having at least one element selected from carbon, hydrogen, oxygen, halogen, nitrogen, sulfur, phosphorus, boron and silicon. Among these, compounds in which a relatively bulky substituent is bound to an atom present between the ether bonds, and a plurality of carbon atoms are included in the atoms linking the ether bonds, are preferred.

Such compounds having two or more ether bonds may be exemplified by compounds represented by the following general formula (5):

[Chem. 3]

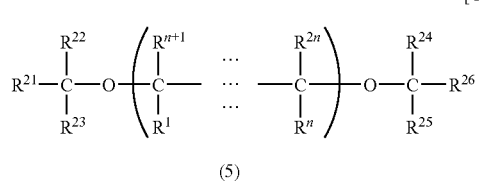

(5)

In the general formula (5), n is an integer of $2 \leq n \leq 10$; $R^1$ to $R^2$ are each a substituent having at least one element selected from carbon, hydrogen, oxygen, halogen, nitrogen, sulfur, phosphorus, boron and silicon, and any of $R^1$ to $R^{26}$, preferably $R^1$ to $R^{2n}$ may form a ring together other than a benzene ring; and atoms other than carbon may be contained in the main chain.

The compounds having two or more ether bonds as described above may include 2-(2-ethylhexyl)-1,3-dimethoxypropane, 2-isopropyl-1,3-dimethoxypropane, 2-butyl-1,3-dimethoxypropane, 2-s-butyl-1,3-dimethoxypropane, 2-cyclohexyl-1,3-dimethoxypropane, 2-phenyl-1,3-dimethoxypropane, 2-cumyl-1,3-dimethoxypropane, 2-isopropyl-2-isobutyl-1,3-dimethoxypropane, 2-(2-phenylethyl)-1,3-dimethoxypropane, 2-(2-cyclohexylethyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-isopropyl-1,3-dimethoxypropane, 2-methyl-2-phenyl-1,3-dimethoxypropane, 2-methyl-2-cyclohexyl-1,3-dimethoxypropane, 2-methyl-2-isobutyl-1,3-dimethoxypropane, 2,2-diisobutyl-1,3-dimethoxypropane, 2,2-diphenyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-s-butyl-1,3-dimethoxypropane, 2,2-di-t-butyl-1,3-dimethoxypropane, 2,2-dineopentyl-1,3-dimethoxypropane, 2-isopropyl-2-isopentyl-1,3-dimethoxypropane, 2-cyclohexyl-2-cyclohexylmethyl-1,3-dimethoxypropane, 2,3-diphenyl-1,4-diethoxybutane, 2,3-dicyclohexyl-1,4-diethoxybutane, 2,3-dicyclohexyl-1,4-diethoxybutane, 2,3-diisopropyl-1,4-diethoxybutane, 2,4-diphenyl-1,5-dimethoxypentane, 2,5-diphenyl-1,5-dimethoxyhexane, 2,4-diisopropyl-1,5-dimethoxypentane, 2,4-diisobutyl-1,5-dimethoxypentane, 2,4-diisoamyl-1,5-dimethoxypentane, 1,2-diisobutoxypropane, 1,2-diisobutoxyethane, 1,3-diisoamyloxyethane, 1,3-diisoamyloxypropane, 1,3-diisoneopentyloxyethane, 1,3-dineopentyloxypropane, 1,2-bis(methoxymethyl)cyclohexane, 3,3-diisobutyl-1,5-oxononane, 6,6-diisobutyldioxyheptane, 1,1-dimethoxymethylcyclopentane, 2-methyl-2-methoxymethyl-1,3-dimethoxypropane, 2-cyclohexyl-2-ethoxymethyl-1,3-diethoxypropane, 2-cyclohexyl-2-methoxymethyl-1,3-dimethoxypropane, 2,2-diisobutyl-1,3-dimethoxycyclohexane, 2-isopropyl-2-isoamyl-1,3-dimethoxycyclohexane, 2-cyclohexyl-2-methoxymethyl-1,3-dimethoxycyclohexane, 2-isopropyl-2-methoxymethyl-1,3-dimethoxycyclohexane, 2-isobutyl-2-methoxymethyl-1,3-dimethoxycyclohexane, 2-cyclohexyl-2-ethoxymethyl-1,3-dimethoxycyclohexane, 2-isopropyl-2-ethoxymethyl-1,3-dimethoxycyclohexane, 2-isobutyl-2-ethoxymethyl-1,3-dimethoxycyclohexane, diphenylbis(methoxymethyl)silane, di-t-butylbis(methoxymethyl)silane and cyclohexyl-t-butyl-bis(methoxymethyl)silane.

Among these, 1,3-diethers are preferred, and particularly 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane are preferred.

(D) Organometallic Compounds

As the organometallic compounds (D) used in the invention, specifically the organometallic compounds having the elements from Groups 1, 2 and Groups 12, 13 of the Periodic Table, such as those represented by the following general formulae (6-1) to (6-3), can be arbitrarily used.

Organoaluminum compounds represented by the general formula:

$$R^a_m Al(OR^b)_n H_p X_q \quad (6-1)$$

wherein $R^a$ and $R^b$ may be identical with or different from each other, and each represent a hydrocarbon group having 1 to 20, preferably 1 to 10, carbon atom(s), and more preferably a hydrocarbon group having 1 to 8 carbon atom(s); X represents a halogen atom; and m, n, p and q are real numbers such that $0 < m \leq 3$, $0 \leq n < 3$, $0 \leq p < 3$, $0 \leq q < 3$, and $m+n+p+q=3$. Specific examples of such compound include trimethylaluminum, triethylaluminum, triisobutylaluminum, trioctylaluminum, diisobutylaluminum hydride and diethylaluminum ethoxide.

Alkylated complexes of a metal from Group 1 of the Periodic Table and aluminum, represented by the general formula:

$$M^a Al R^a_4 \quad (6-2)$$

Wherein Ma represents Li, Na or K; and $R^a$ represents a hydrocarbon group having 1 to 15, preferably 1 to 4, carbon atom(s). Such compounds may be exemplified by LiAl$(C_2H_5)_4$ and LiAl$(C_7H_{15})_4$.

Dialkyl compounds of a metal from Group 2 or Group 12 of the Periodic Table, represented by the general formula:

$$R^a R^b M^b \quad (6-3)$$

Wherein $R^a$ and $R^b$ may be identical with and different from each other, and each represent a hydrocarbon group having 1 to 15, preferably 1 to 4, carbon atom(s); and Mb is Mg, Zn or Cd.

Among the organometallic compounds (D) described above, organoaluminum compounds are preferred, and particularly the organoaluminum compounds of the formula (6-1) are preferred. Further, these organometallic compounds may be used individually or in combination of two or more species.

Upon the production of the capsular fine particles comprising the olefinic polymer of the invention, (E) a nonionic surfactant may be also used as the catalyst component for olefin polymerization to be used, in addition to the (A) magnesium-containing support component, (B) transition metal compound, (C) liquid titanium compound and (D) organometallic compound.

When the nonionic surfactant (E) is used, polymer adhesion to the walls of the polymerization vessel and stirring blades during polymerization can be prevented, and thus the productivity can be improved.

Hereinafter, the component (E) will be described.

(E) Nonionic Surfactant (E-1) Polyalkylene Oxide Block

The (E-1) polyalkylene oxides block used in the invention are generally used as a nonionic surfactant, and any of conventionally known polyalkylene oxide blocks can be used without limitation.

(E-2) Higher Aliphatic Amide

The (E-2) higher aliphatic amides used in the invention are generally used as a nonionic surfactant, and any of conventionally known higher aliphatic amides can be used without limitation.

(E-3) Polyalkylene Oxide

For the (E-3) polyalkylene oxides used in the invention, any of conventionally known polyalkylene oxide can be used without limitation.

(E-4) Polyalkylene Oxide Alkyl Ether

The (E-4) polyalkylene oxide alkyl ethers used in the invention are generally used as a nonionic surfactant, and any of conventionally known polyalkylene oxide alkyl ethers can be used without limitation.

(E-5) Alkyldiethanolamine

The (E-5) alkyldiethanolamines used in the invention are generally used as a nonionic surfactant, and any of conventionally known alkyldiethanolamines can be used without limitation.

(E-6) Polyoxyalkylene Alkylamine

The (E-6) polyoxyalkylene alkylamines used in the invention are generally used as a nonionic surfactant, and any of conventionally known polyoxyalkylene alkylamine can be used without limitation.

Such nonionic surfactants are preferably liquid at room temperature from the viewpoint of handleability. Furthermore, such nonionic surfactants can be used as a neat liquid or as a solution after being diluted with a solvent. The term "dilution" as used in the invention encompasses all the states in which a nonionic surfactant and a liquid that is inert to the nonionic surfactant are mixed or dispersed. That is, the dilution is a solution or dispersion, and more specifically a solution, a suspension or an emulsion. Among these, it is preferable that a nonionic surfactant and a solvent are mixed to be in a solution state.

Examples of the inert liquid include aliphatic hydrocarbons, alicyclic hydrocarbons, aromatic hydrocarbons, unsaturated aliphatic hydrocarbons and halogenated hydrocarbons. Among these, in the case of aliphatic hydrocarbons, alicyclic hydrocarbons, aromatic hydrocarbons and halogenated hydrocarbons, those forming a solution state when mixed with the nonionic surfactants are preferred. More preferably, those forming a solution state when mixed with the nonionic surfactants, for example, aliphatic hydrocarbons such as pentane, hexane, heptane, octane, decane, dodecane, kerosene and mineral oil, and alicyclic hydrocarbons such as cyclopentane, cyclohexane and methylcyclopentane, are desirable.

Hereinafter, the method of producing the capsular fine particles comprising the olefinic polymer will be further described.

The specific solid catalyst components for olefin polymerization used in the invention may be prepolymerized with an olefin monomer having 2 to 20 carbon atoms, which may be homopolymers of a single species of olefin monomer, or may be copolymers containing 0.01 to 5% by mole of other olefin monomers.

Furthermore, according to the invention, the polymerization can be performed by way of suspension polymerization or gas phase polymerization. As the inert hydrocarbon media used in the suspension polymerization, there may be specifically mentioned aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane; or mixtures thereof, and the olefins themselves can also be used as the solvents.

During the production of the capsular fine particles comprising the olefinic polymer using the specific polymerizing catalyst component of the invention as described above, the transition metal compound (B) is typically used in an amount that would become $10^{-11}$ to 10 millimoles, and preferably $10^{-9}$ to 1 millimoles, in terms of the transition metal atom in the component (B), per 1 liter of a reaction volume. That is, in a case of suspension polymerization, the reaction volume is a volume of the liquid phase portion in the reaction system in the polymerization reactor, and in a case of gas phase polymerization, the volume is a volume of the portion involved in the reaction in the polymerization reactor.

The organometallic compound (D) is used in an amount of 0.1 to 500% by weight, and preferably 0.2 to 400% by weight, based on the magnesium-containing support component (A) of the invention.

The polymerization temperature is usually in the range of from −50 to +200° C., and preferably from 0 to 170° C. The polymerization pressure is usually from normal pressure to 100 kg/cm$^2$, and preferably from normal pressure to 50 kg/cm$^2$, and the polymerization reaction can be performed in any way among batchwise, semi-continuously, and continuously. It is also possible to perform the polymerization in two or more stages with different reaction conditions.

The molecular weight of the resulting fine particles comprising an olefinic polymer can be controlled by adding hydrogen to the polymerization system, or by changing the polymerization temperature. The molecular weight can also be controlled by the type of the component (C) used, and the type or use amount of the electron donor.

The fine particles comprising an olefinic polymer that are obtained by performing slurry polymerization or gas phase polymerization using the specific catalyst component for olefin polymerization thus obtained, are microparticulate and spherical, have a narrow particle size distribution, have good flowability, and do not result in any polymer adhesion to the walls of the polymerization vessel or stirring blades.

[Process 2]

The Process 2, which constitutes the method of producing the capsular fine particles comprising the olefinic polymer according to the invention, that is, the method of removing the solid catalyst component forming the inner layer of the fine particles comprising the olefinic polymer, will be described.

The removal of the inorganic material in the solid catalyst component can be carried out by mixing the fine particles with a mixed solution of an alcohol having 2 to 10 carbon atoms and a chelating compound (F), and then stirring the mixture at a temperature of 75° C. or higher.

The alcohol having 2 to 10 carbon atoms may be exemplified by ethanol, n-propyl alcohol, isopropyl alcohol, n-butyl alcohol, isobutyl alcohol, t-butyl alcohol, n-pentyl alcohol, n-hexyl alcohol, n-heptyl alcohol, n-octyl alcohol, 2-ethylhexyl alcohol, n-nonyl alcohol and n-decyl alcohol, but is not limited thereto. Among these, preferably isopropyl alcohol, n-butyl alcohol, isobutyl alcohol, t-butyl alcohol and 2-ethylhexyl alcohol are used.

The chelating compound (F) may be any of the compounds which can form a chelate complex with magnesium or aluminum, both of which are inorganic metals in the polymer, but the compound is preferably a diketone compound, and among them, acetylacetone is more preferably used.

The reaction for removing inorganic material under an atmosphere of inert gas such as nitrogen comprises (i) a process of mixing the fine particles, the alcohol and the chelating compound at room temperature; raising the temperature of the resulting mixture while stirring; (ii) a process of reacting the mixture at a predetermined reaction temperature for a predetermined time; and (iii) a process of filtering, washing and drying the slurry. In the first mixing process, 3 to 100 parts by weight of the alcohol and 2 to 100 parts by weight of the chelating compound (F), based on 1 part by weight of the polymer, are mixed. Here, the molar ratio of the alcohol and the chelating compound is preferably between 98/2 and 50/50. The reaction temperature is in a range from 75 to 130° C., and preferably from 80 to 120° C., while the reaction time is from 10 minutes to 10 hours, and preferably from 0.5 to 5 hours. After the reaction, the reaction mixture is filtered, washed and dried to obtain fine particles.

Upon the removal of inorganic material in the fine particles comprising an olefinic polymer according to the invention, if necessary, an acid absorbent (G) such as ethylene oxide and propylene oxide may be added for the purpose of scavenging the hydrochloric acid generated by the reaction between the chelating compound (F) and the catalyst component.

The acid absorbent (G) can be added in an amount of 3 to 10 parts by weight, relative to 100 parts by weight of alcohol, which is a deashing solvent. The timing of adding the acid absorbent may be at the beginning of the reaction, or may be in the middle of the reaction. Finally, by drying the produced capsular fine particles comprising the olefinic polymer, capsular fine particles comprising the olefinic polymer and having a gas as the encapsulated material, can be obtained. According to necessity, the capsular fine particles comprising the olefinic polymer of the invention can be subjected to the [Process 3], for introducing an organic material as the encapsulated material.

[Process 3]

With regard to the introduction of a gas into the inner layer portion of the capsular fine particles comprising the olefinic polymer of the invention, the gas used in the drying process in the above-described Process 2 is encapsulated. Furthermore, after the drying, the gas to be encapsulated may be replaced by placing the capsular fine particles comprising the olefinic polymer under an atmosphere of the encapsulated gas.

Also, with regard to the introduction of an organic material, in the case where the drying process in the Process 2 is omitted, it can be considered that the alcohol used in the Process 2 has been already encapsulated. As a method of encapsulating an organic material other than the alcohol used in the Process 2, there may be mentioned a method of suspending dried capsular fine particles in the organic material in a liquid state, thus to allow the organic material to penetrate into the inner layer portion.

Moreover, in this method, an inorganic material can also be introduced into the inner layer portion by dissolving the inorganic material in a solvent, allowing the solvent dissolving the inorganic material to permeate into the inner layer as described above, and drying the solvent as needed. Also, capsular fine particles having a polymer in the inner layer can also be produced by encapsulating a polymerizable organic material and a polymerization initiator in the inner layer portion, and polymerizing the organic material.

[Capsular Fine Particles Comprising Olefinic Polymer Having Functional Group]

The olefinic polymer constituting the capsular fine particles comprising the olefinic polymer of the invention may have a functional group.

The functional group is chemically bonded to the olefinic polymer, and thus, the infrared absorption spectrum obtained after a methanol treatment of the capsular fine particles comprising the olefinic polymer having a functional group is substantially identical to the infrared absorption spectrum of the particles obtained before the methanol treatment.

Furthermore, selecting the functional group to be introduced, the capsular fine particles can be imparted with adhesiveness, hydrophilicity, lipophilicity, water repellency, oil repellency, flowability or dyeing affinity.

The methanol treatment of the capsular fine particles comprising the olefinic polymer having the functional group of the invention comprises specifically stirring a suspension obtained by mixing 1 (one) part by weight of the capsular fine particles and 100 parts by weight of methanol, at room temperature for 30 minutes, then filtering the suspension, and drying the filtered cake under reduced pressure at 80° C. for 10 hours, and the phrase that "the infrared absorption spectra is substantially identical" means that the absorption intensity I of the infrared absorption spectra satisfies the following Expression (7):

$$[I\lambda(f)-I\lambda(i)]/I\lambda(i) \leq 0.1 \quad (7)$$

In the Expression (7), $I\lambda(i)$ represents the absorption intensity at a wavelength of $\lambda_0$ obtained before the methanol treatment; $I\lambda(f)$ represents the absorption intensity at a wavelength of $\lambda_0$ obtained after the methanol treatment; and $\lambda_0$ is selected from 300 to 4000 $cm^{-1}$.

The functional group for the capsular fine particles comprising the olefinic polymer having the functional group of the invention may be specifically exemplified by groups having an unsaturated bond, such as vinyl, vinylidene vinylene; oxygen-containing groups such as an epoxy group, a hydroxyl group, a carboxyl group, an aldehyde group, a ketone group, a polyethylene glycol group and a polypropylene glycol group; nitrogen-containing groups such as an amino group, a nitro group, an imino group, an amide group and a nitrile group; fluorine-containing groups such as a fluorine group and a perfluoroalkyl group; sulfur-containing groups such as a thiol group, a sulfonyl group, a thionylchloro group and a sulfonylamide group; silicon-containing groups such as an alkylsilyl group and a siloxane group; germanium-containing groups such as an alkylgermanium group; or a tin-containing group such as an alkyltin group.

Among these functional groups, the groups having an unsaturated bond, such as vinyl, vinylidene and vinylene, carboxylic acid (salt) groups and an ester groups can be incorporated in the fine particles of the olefinic polymer obtained by homopolymerizing ethylene, or by copolymerizing ethylene with at least one monomer selected from α-olefins having 3 to 6 carbon atoms, dienes, trienes and polar group-containing olefins, in the presence of the specific catalyst component for olefin polymerization. Also, the epoxy group, sulfonyl group, hydroxyl group, silyl group or halogen group can be provided to the olefinic polymer obtained by chemically treating the unsaturated bond-containing fine particles produced as described above, with at least one compound selected from an epoxylating agent, a sulfonating agent, maleic anhydride, a hydroboronating agent, diisobutylaluminum hydride, a silylating agent and a halogenating agent.

For example, in the case of producing fine particles of epoxy group-containing ethylenic polymer, there can be mentioned epoxylating methods illustrated below, but the method is not limited thereto.

[1] Oxidation by peracid such as performic acid, peracetic acid and perbenzoic acid;

[2] Oxidation by titanosilicate or hydrogen peroxide;

[3] Oxidation by a rhenium oxide catalyst such as methyltrioxorhenium, and hydrogen peroxide;

[4] Oxidation by a porphyrin complex catalyst such as manganese porphyrin or iron porphyrin, and hydrogen peroxide or hypochlorite;

[5] Oxidation by a salen complex such as manganese-salen, and hydrogen peroxide or hypochlorite;

[6] Oxidation by a triazacyclononane (TACN) complex such as manganese—TACN complex and hydrogen peroxide; and

[7] Oxidation by hydrogen peroxide in the presence of a Group VI transition metal catalyst such as a tungsten compound and a phase transfer catalyst.

Furthermore, an amino group, a siloxane group, a polyethylene glycol group, a polypropylene glycol group or a perfluoroalkyl group can be provided to the fine particles to be produced, by treating fine particles containing an epoxy group or a hydroxyl group with amines, ethylene glycol, polyethylene glycol and amination products thereof, propylene glycol and amination products thereof, polypropylene glycol, siloxane, perfluoroalkyl ester groups. Also, a hydroxyl group, a carboxyl group, an amino group, a vinylene group or a fluorine group can be provided to the fine particles containing the aforementioned functional groups or polyethylene polymer fine particles containing no substantial functional group, through a treatment with oxidative strong acid, vapor treatment, corona discharge treatment, plasma irradiation, electron beam irradiation, laser irradiation or UV irradiation.

It is preferable for these functional groups if the number of the functional groups as measured by IR (infrared absorption spectroscopic method) or NMR (nuclear magnetic resonance spectroscopic method) is ranging from 0.01 to 20, preferably from 0.02 to 20, more preferably from 0.02 to 10, and even more preferably from 0.02 to 8, per 1000 carbon atoms in the constituting particles.

Hereinafter, an exemplary method of quantifying the vinyl group and the vinylidene group by IR will be described.

<Infrared Absorption Spectroscopic Method>

Using a commercially available infrared spectrophotometer (manufactured by JASCO Corp.; DS-702G) and using a standard sample, a solid thin film having a thickness of about from 0.15 cm to 0.25 cm is produced by a hot rolling method, and an infrared absorption spectrum thereof is measured with the wavelength range between 1000 and 850 $cm^{-1}$.

<Method of Measuring the Number of Vinyl Groups>

Using 1-eicosene (having 20 carbon atoms) as a model substance, it is confirmed that the out-of-plane deformation vibration frequency of this substance is at 910 $cm^{-1}$. Using this absorption band, and using 1-eicosene and polyethylene containing no unsaturated bond, the absorbance of a sample with known number of vinyl groups, and the film thickness of the sample were measured to determine the absorbance per unit thickness. When the relationship between the number of vinyl groups and this absorbance per unit thickness of film is plotted, a calibration curve, which is approximately linear, can be obtained. Therefore, the absorbance per unit thickness of film is measured for various samples using this calibration curve, and the corresponding number of vinyl groups is determined from this calibration curve.

<Method of Measuring the Number of Vinylidene Groups>

A calibration curve is prepared, which is identical to the calibration curve related to the number of vinyl groups. Here, the model substance used is 2,5-dimethyl-1,5-hexadiene. The absorption band used is 890 $cm^{-1}$, where absorption is observed.

[Method of Producing Capsular Fine Particles Comprising Olefinic Polymer Having Functional Group]

Hereinafter, the method of producing the capsular fine particles comprising the olefinic polymer having the functional group of the invention will be described. The production method is largely classified to the following Method 1, Method 2, Method 3 and Method 4 and Method 5, which is an embodiment thereof. However, the invention is not to be limited to these production methods as long as the properties and nature of the capsular fine particles comprising the olefinic polymer having the functional group of the invention are satisfied.

The capsular fine particles comprising the olefinic polymer having the functional group of the invention can be produced by the following Method 1 and Method 2, using a specific catalyst component for olefin polymerization comprising a solid catalyst component, which comprises a transition metal complex component and the magnesium-containing support component described above, and an organometallic compound. Furthermore, the capsular fine particles mentioned above can also be produced by subjecting the capsular fine particles comprising the olefinic polymer as produced above, to the Method 3 and Method 4. Also, the Method 5 can also be used in the production.

(Method 1)

The Method 1 for producing the capsular fine particles comprising the olefinic polymer having the functional group of the invention is a method applicable to an olefinic polymer obtained by homopolymerizing or copolymerizing at least one monomer selected from linear or branched α-olefins having 2 to 6 carbon atoms, cyclic olefins, dienes and aromatic vinyl compounds, in the presence of a polymerizing catalyst component comprising an organometallic compound and a solid catalyst component which comprises the transition metal complex component disclosed in JP-A No. $H_{11}$-315109, JP-A No. 2000-239312, EP-1043341, EP-1008595, WO 99/12981 or Japanese Patent Application No. 2003-173479, and the magnesium-containing support component described above, in the same manner as in the case for the capsular fine particles comprising the olefinic polymer, which method is used to remove the solid catalyst component forming the inner layer. The fine particles generated by this method have a group containing unsaturated bonds, comprising a vinyl group, a vinylene group or a vinylidene group as the functional group.

(Method 2)

The Method 2 for producing the capsular fine particles comprising the olefinic polymer having the functional group of the invention is a method applicable to an olefinic polymer obtained by homopolymerizing or copolymerizing at least one monomer selected from linear or branched α-olefins having 2 to 6 carbon atoms, dienes, trienes and polar group-containing olefins, in the presence of a polymerizing catalyst component comprising an organometallic compound and a solid catalyst component which comprises the transition metal complex component disclosed in JP-A No. H11-315109, Chemical Review 100, 1169 (2000), Chemical Review 103, 283 (2003), Japanese Patent Application No. 2003-173479, Angewandte Chemie, International Edition. English 34 (1995), and Chemical Review 8, 2587 (1998) 2587, and the magnesium-containing support component described above, in the same manner as in the case for the capsular fine particles comprising the olefinic polymer, which method is used to remove the solid catalyst component forming the inner layer.

The functional groups of the fine particles generated by this method have a group containing unsaturated bonds, including a vinyl group, a vinylene group and a vinylidene group, or a polar functional group such as a carboxylic acid (salt) group and an ester group.

(Method 3)

The Method 3 for producing the capsular fine particles comprising the olefinic polymer having the functional group of the invention is as follows. First, fine particles comprising the olefinic polymer obtained by homopolymerizing or copolymerizing at least one monomer selected from linear or branched α-olefins having 2 to 6 carbon atoms, cyclic olefins, dienes, trienes and polar group-containing olefins, in the presence of a polymerizing catalyst component comprising an organometallic compound and a solid catalyst component which comprises the transition metal complex component used in Method 1 and Method 2, and the magnesium-containing support component described above. Subsequently, by any one of a method of removing the solid catalyst component forming the inner layer from the resulting fine particles comprising the olefinic polymer, and then treating the fine particles with an epoxylating agent, a sulfonating agent, maleic anhydride, a hydroboronating agent, an alkylaluminum, a silylating agent, a halogenating agent, chromosulfuric acid, chromic acid or nitric acid; and a method of treating the fine particles comprising the olefinic polymer with an epoxylating agent, a sulfonating agent, maleic anhydride, a hydroboronating agent, an alkylaluminum, a silylating agent, a halogenating agent, chromosulfuric acid, chromic acid or nitric acid, and then removing the solid catalyst component forming the inner layer, the capsular fine particles comprising the olefinic polymer having the functional group can be obtained.

The fine particles obtained by these methods have a functional group such as an epoxy group, a hydroxyl group, a carboxyl group, a silyl group, a halogen group or a sulfonic acid group.

(Method 4)

The Method 4 for producing the capsular fine particles comprising the olefinic polymer having the functional group of the invention is a method of subjecting the capsular fine particles comprising the olefinic polymer having the functional group obtained by any one of Method 1, Method 2 and Method 3, to surface modification by vapor treatment, corona discharge treatment, plasma irradiation, electron beam irradiation, laser irradiation or UV irradiation; or a method of subjecting the capsular fine particles comprising the olefinic polymer obtained by homopolymerizing or copolymerizing at least one monomer selected from linear or branched α-olefins having 2 to 6 carbon atoms, cyclic olefins, dienes, trienes and polar group-containing olefins, in the presence of a polymerizing catalyst component comprising an organometallic compound and a solid catalyst component which comprises the transition metal complex component used in Method 1 and Method 2, and the magnesium-containing support component described above, to surface modification by vapor treatment, corona discharge treatment, plasma irradiation, electron beam irradiation, laser irradiation or UV irradiation. The capsular fine particles obtained by these methods have a functional group such as a vinylene group, a hydroxyl group, a carboxyl group, a carbonyl group, an amino group, a fluorine group or a silyl group.

(Method 5)

The Method 5 for producing the capsular fine particles comprising the olefinic polymer having the functional group of the invention is a method of producing capsular fine particles comprising the olefinic polymer having any one functional group among a hydroxyl group, a halogen group, a nitrogen-containing group and a sulfur-containing group, by a process, in which fine particles comprising the olefinic polymer having any one functional group among a hydroxyl group, a halogen group, a nitrogen-containing group and a sulfur-containing group are obtained by a process of reacting an olefinic polymer having Al at one end, which is obtained by homopolymerizing or copolymerizing one or more olefin monomers selected from α-olefins having 2 to 20 carbon atoms and cyclic olefins, in the presence of a catalyst component for olefin polymerization comprising:

(A') a solid catalyst component in which a specific transition metal compound represented by the following the general formula (8) or (9) is supported on the magnesium-containing support component described above, and (D') an organometallic compound, with oxygen, a halogen compound, a nitrogen-containing compound or a sulfur-containing compound, and then the solid catalyst component forming the olefinic polymer inner layer is removed.

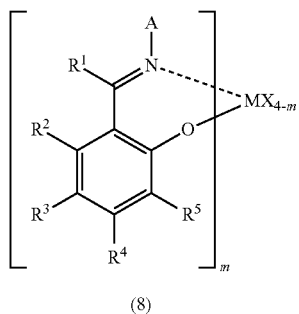

(8)

For the olefin monomer used upon producing the capsular fine particles comprising the olefinic polymer having Al at one end in the Process 1 of the invention, the same ones as those used for the capsular fine particles comprising the olefinic polymer mentioned above can be used.

Furthermore, the polymerizing catalyst component used upon producing the capsular fine particles comprising the olefinic polymer having Al at one end in the Process 1 according to the invention will be explained.

The polymerizing catalyst component used for the production of the capsular fine particles comprising the olefinic polymer having Al at one end of the invention is composed of:

A solid catalyst component in which the specific transition metal compound represented by the general formula (8) or formula (9) is supported on (A') the magnesium-containing support component, and (D') An Organometallic Compound.

The term "supporting" according to the invention refers to the state in which the dissolved portion of the transition metal compound represented by the general formula (8) or formula (9) in at least one solvent selected from hexane, decane and toluene is respectively 1% by weight or less, even after stirring at normal pressure and at room temperature for 1 minute to 1 hour.

Next, the above-mentioned methods will be specifically illustrated.

(Magnesium-Containing Support Component (A'))

The magnesium-containing support component (A') used in the production of the capsular fine particles comprising the olefinic polymer having Al at one end, is the same as the magnesium-containing support component (A) used in the production of the capsular fine particles comprising the olefinic polymer described above.

(Specific Transition Metal Compound)

The transition metal compounds used in the production of the capsular fine particles comprising the olefinic polymer having Al at one end of the invention are compounds represented by the general formula (8).

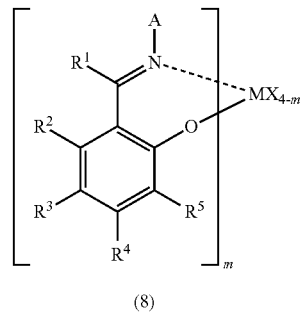

(8)

wherein M represents Zr or Hf; m represents an integer of 1 or 2; "A" represents a 6-membered cyclic hydrocarbon group having one or more alkyl substituent at the 2-position, and may be saturated or unsaturated; $R^1$ to $R^5$, which may be identical with or different from each other, each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, while two or more of these may be linked together to form a ring, and when m is 2, two groups among the groups represented by the $R^1$ to $R^5$ may be linked (with the proviso that $R^1$ and $R^1$ are not bonded to each other); (4−m) is a number satisfying the valency of M; X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, while when m is 2, a plurality of groups represented by X may be identical with or different from each other, and the plurality of groups represented by X may be linked together to each other to form a ring.

Hereinafter, specific examples of the transition metal compound represented by the general formula (8) will be presented, but the transition metal compounds are not limited to these.

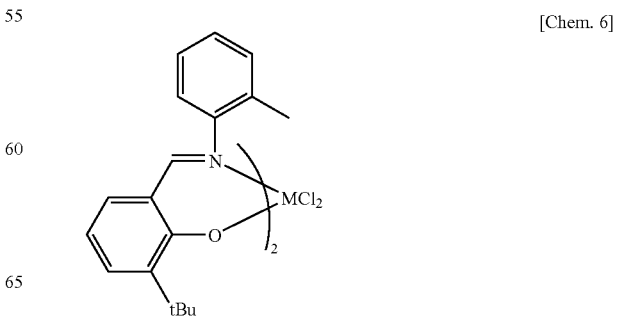

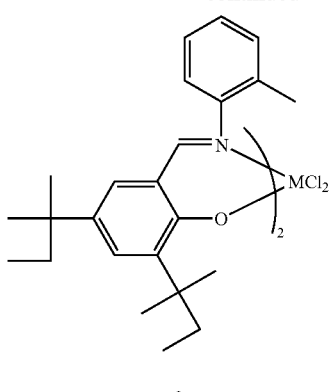
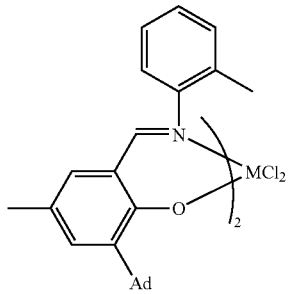
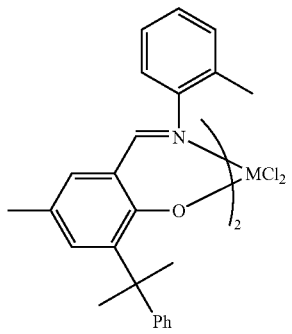
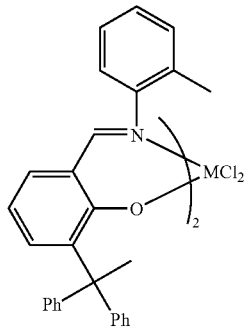
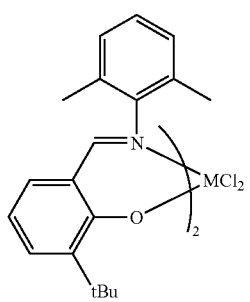
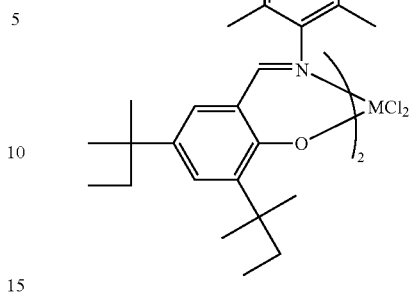
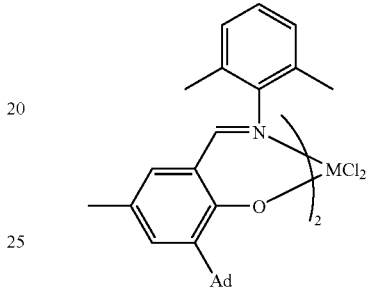
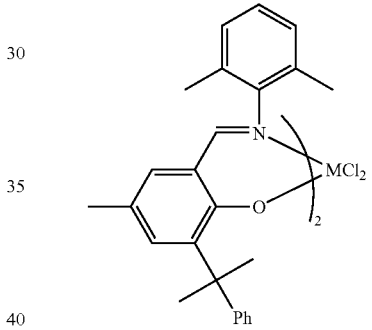
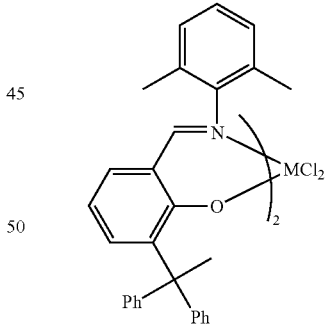
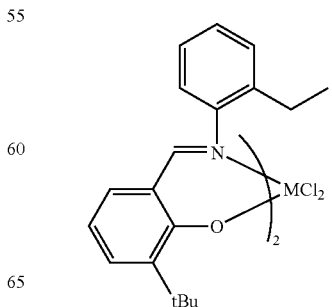

27
-continued
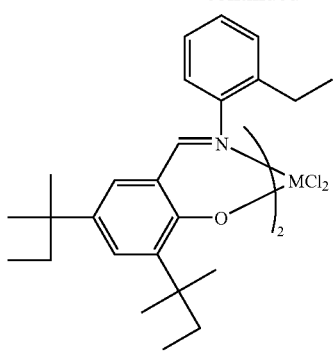
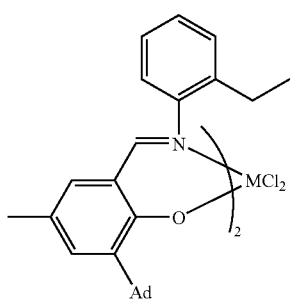
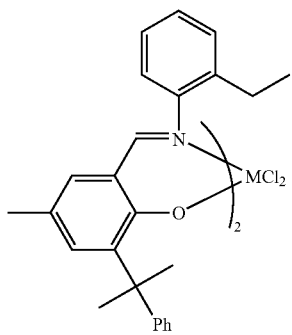
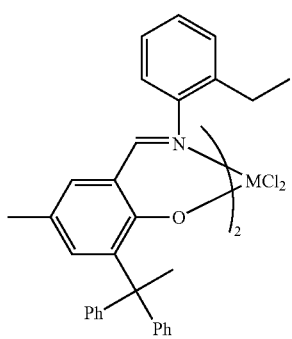
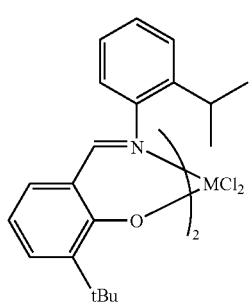
28
-continued
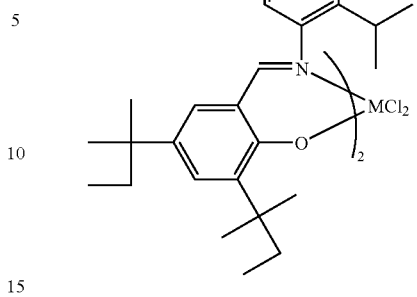
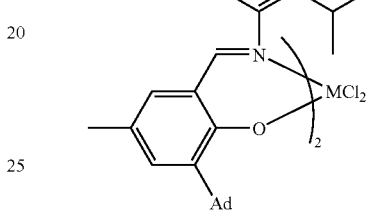
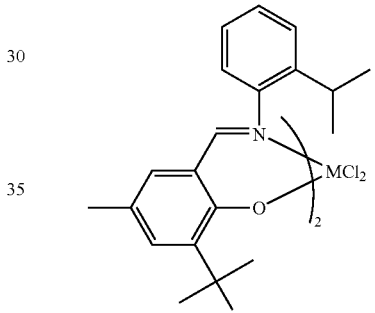
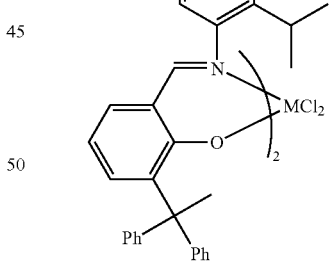
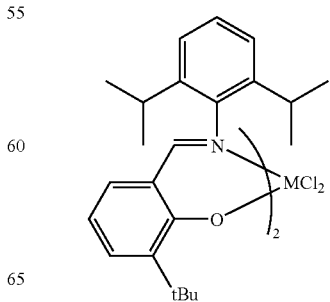

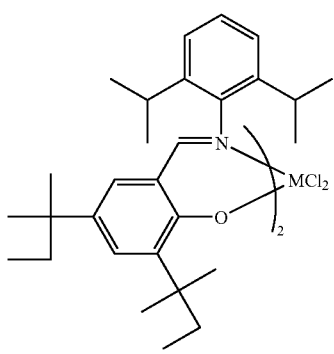
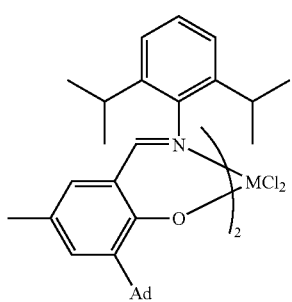
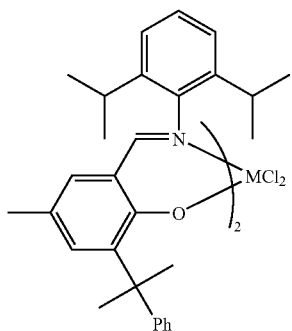
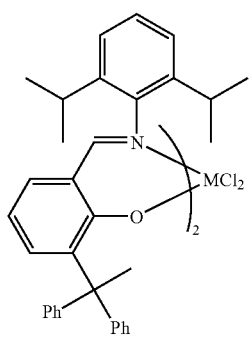
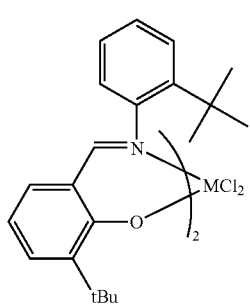
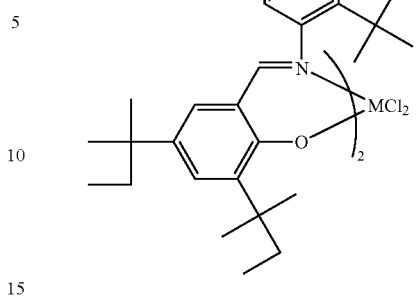
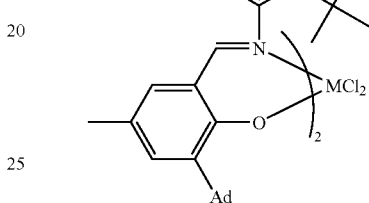
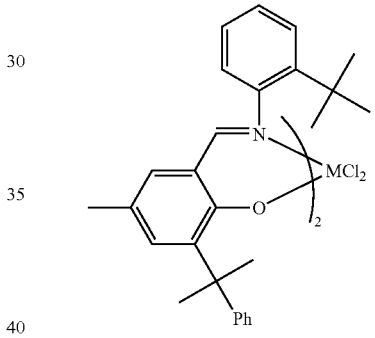
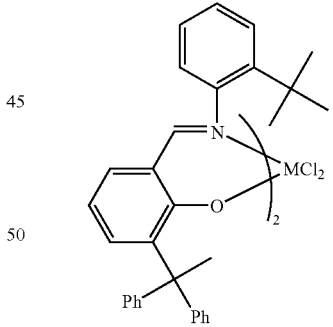
[Chem. 7]
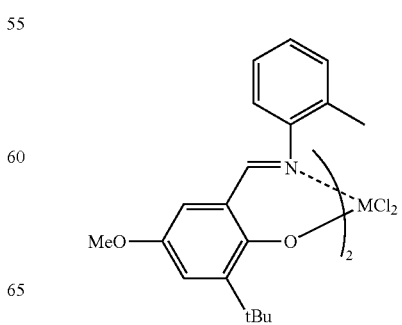

-continued
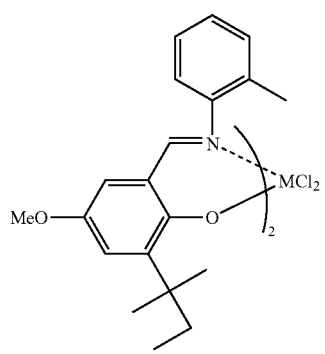
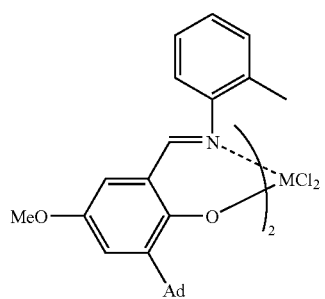
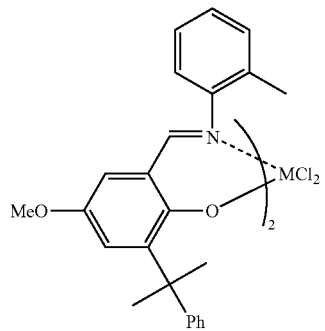
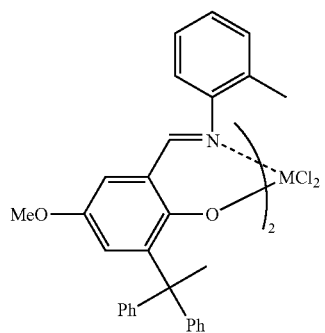
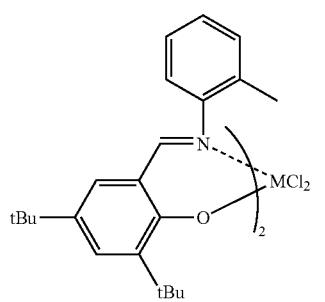
-continued
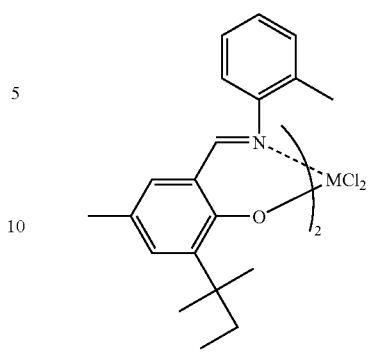
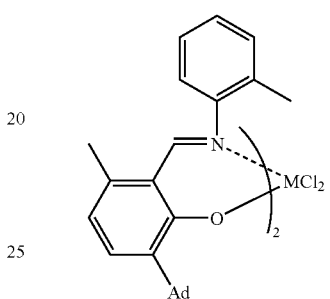
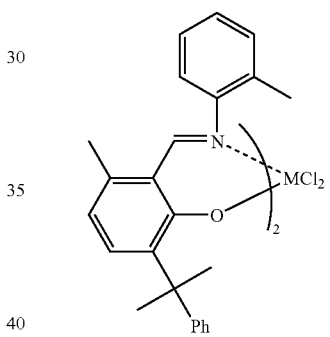
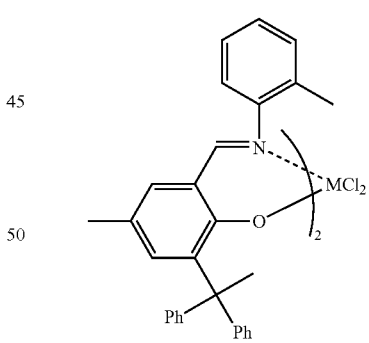
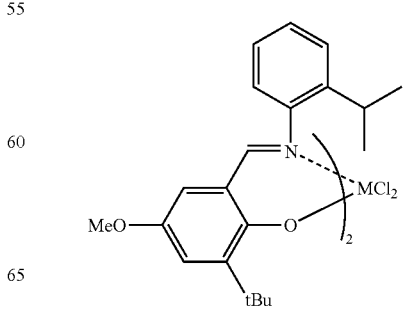

-continued
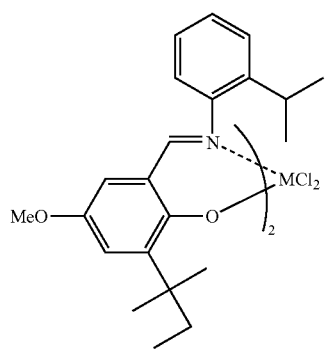
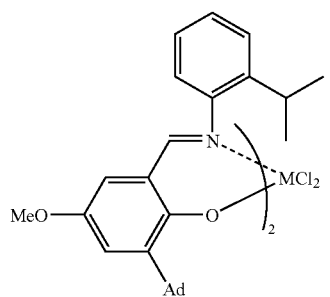
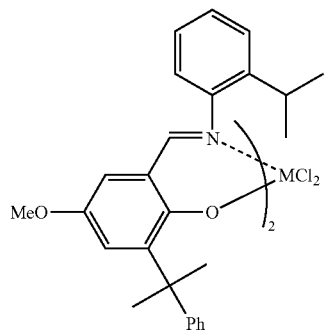
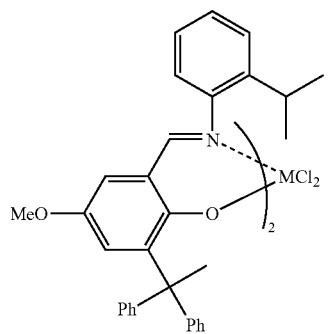
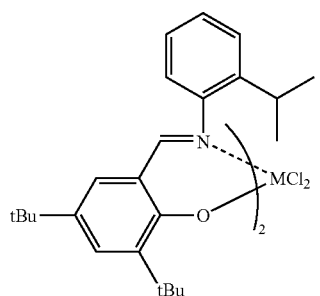
-continued
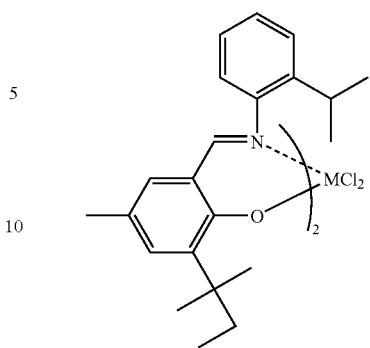
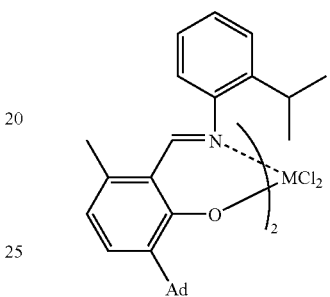
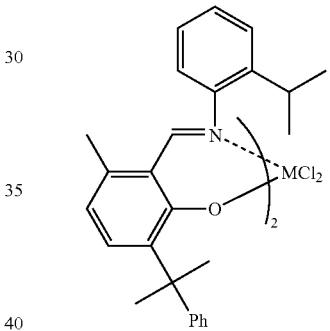
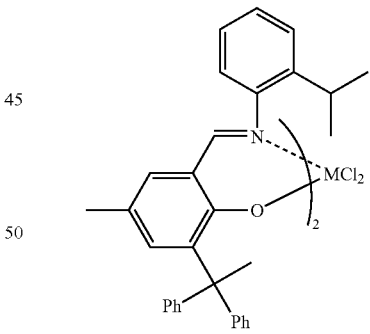
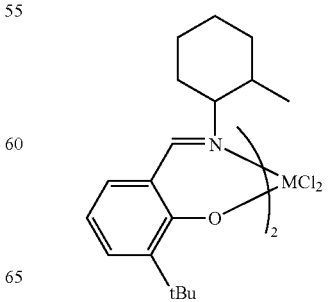

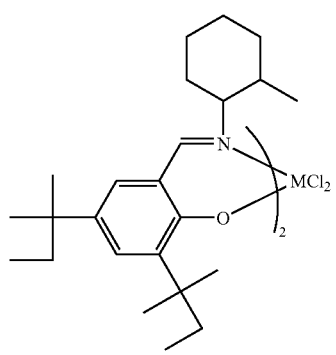
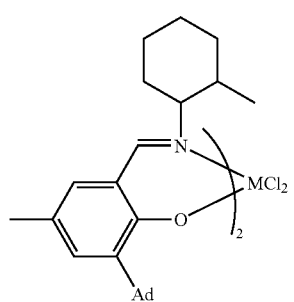
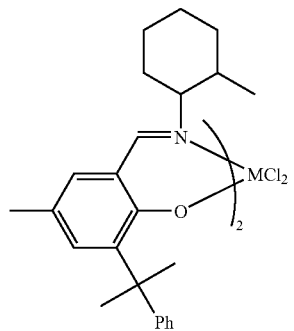
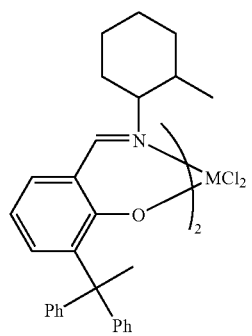
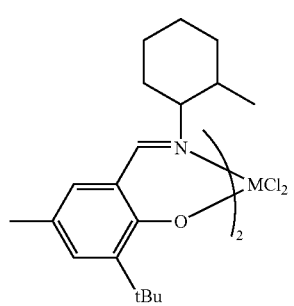
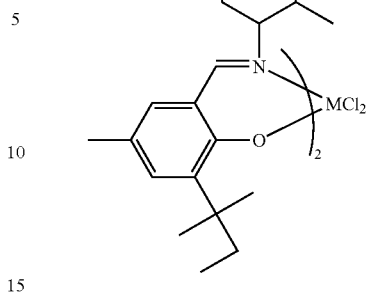
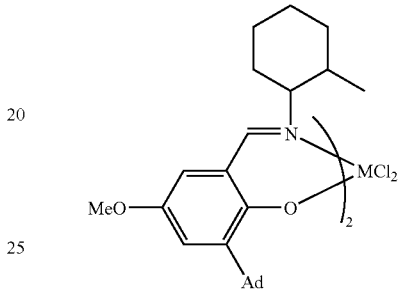
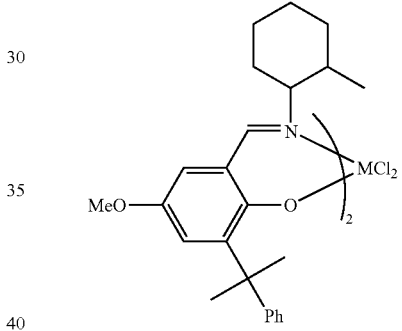
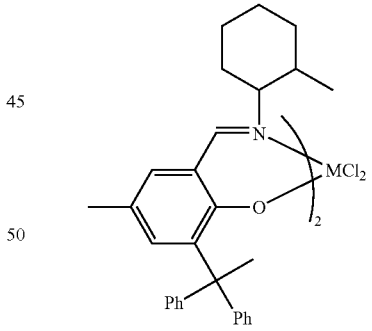
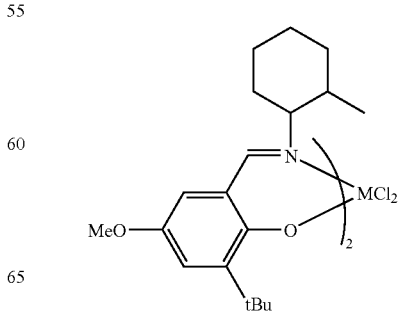
[Chem. 8]

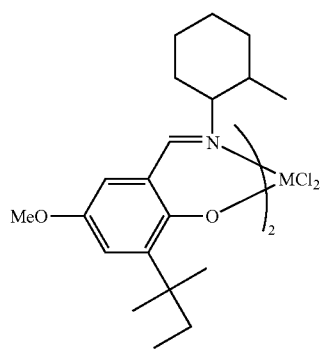
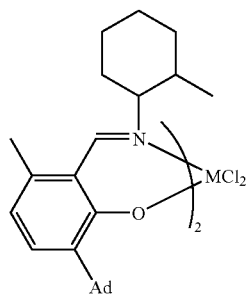
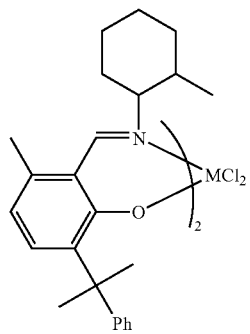
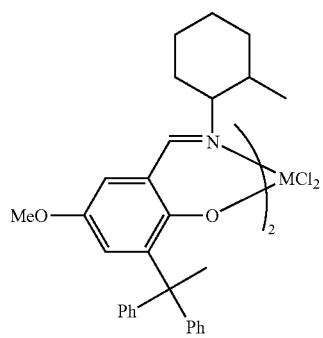
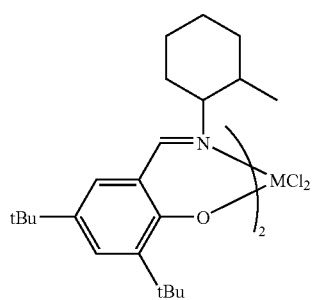

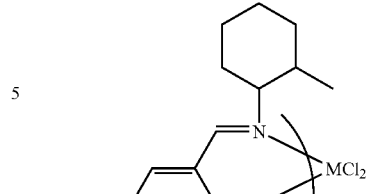
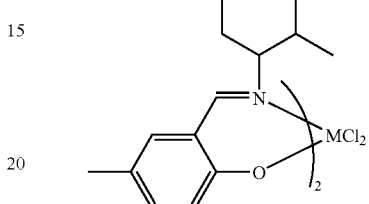
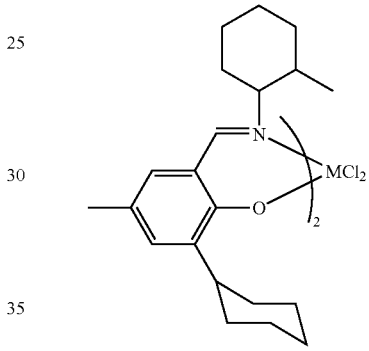
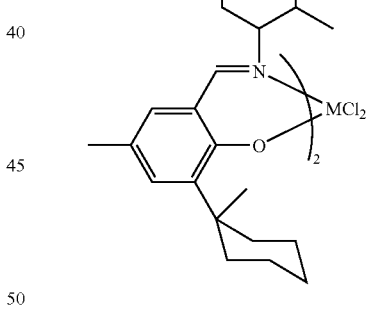
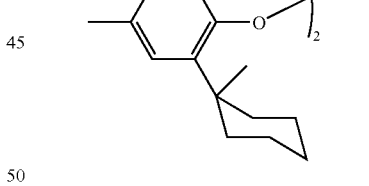

wherein M represents Zr or Hf; Ad represents an adamantyl group; and Me, tBu and Ph represent a methyl group, a t-butyl group and a phenyl group, respectively.

The transition metal compound used in the production of the olefinic polymer fine particles containing Al at one end of the invention, may be a compounds represented by the following general formula (9):

$$RQ(P_Z^1)_i(P_Z^2)_{3-i}MY_mZ_n \qquad (9)$$

In the above general formula (9), R represents a group selected from the group consisting of a hydrogen atom, halogen atoms, hydrocarbon groups, heterocyclic compound residues, oxygen-containing groups, sulfur-containing groups, nitrogen-containing groups, boron-containing groups, aluminum-containing groups, phosphorus-containing groups, halogen-containing groups, silicon-containing groups, germanium-containing groups and tin-containing groups. The halogen atoms, hydrocarbon groups, heterocyclic compound residues, oxygen-containing groups, sulfur-containing groups, nitrogen-containing groups, boron-containing groups, aluminum-containing groups, phosphorus-containing groups, halogen-containing groups, silicon-containing groups, germanium-containing groups and tin-containing groups may be exemplified by the groups mentioned in the definition for X in the above general formula (8).

In the above general formula (9), Q represents a tetravalent group selected from the group consisting of boron, carbon, silicon, germanium, tin and lead, and boron, carbon and silicon are particularly preferred.

In the above general formula (9), $P_Z^1$ is a pyrazolyl group, wherein at least the 3-position is substituted with an unsubstituted aryl group, a substituted aryl group, an alkyl group having 3 or more carbon atoms, a cycloalkyl group, an amino group and an oxyhydrocarbon group or the like. The unsubstituted aryl group may be exemplified by phenyl groups, naphthyl groups and fluorenyl groups, and the substituted aryl group may be exemplified by those resulting from substituting one or multiple nuclear hydrogens of the unsubstituted aryl group with alkyl groups having 1 to 20 carbon atom(s), aryl groups and aralkyl groups. Preferred $P_Z^1$ is one substituted at the 3-position with a 2,4,6-trimethylphenyl group, a 2,4,6-triisopropylphenyl group, a 2,3,4,5,6-pentamethylphenyl group or a 4-t-butyl-2,6-dimethylphenyl group, and one substituted at the 3-position with 2,4,6-trimethylphenyl groups is particularly preferred.

$P_Z^2$ represents an unsubstituted pyrazolyl group or a substituted pyrazolyl group. The substituted pyrazolyl groups may be identical to the $Pz^1$ mentioned above, or may be ones substituted with a group, which is mentioned as the substituent for the substituted aryl group, at any position other than the 3-position.

In the above general formula (9), M represents a transition metal atom selected from the elements of Groups 3 to 11 of the Periodic Table, and specific examples include Group 3 metal atoms such as scandium, yttrium, lanthanoids and actinoids; Group 4 metal atoms such as titanium, zirconium and hafnium; Group 5 metal atoms such as vanadium, niobium and tantalum; Group 6 metal atoms such as chromium, molybdenum and tungsten; Group 7 metal atoms such as manganese, technetium and rhenium; Group 8 metal atoms such as iron, ruthenium and osmium; Group 9 metal atoms such as cobalt, rhodium and iridium; Group 10 metal atoms such as nickel, palladium and platinum; and Group 11 metal atoms such as copper, silver and gold. Among these, the Group 3 metal atoms, Group 4 metal atoms, Group 5 metal atoms and Group 6 metal atoms are preferred, and among these, transition metals such as yttrium, titanium, zirconium, hafnium, vanadium and chromium are preferred. Also, the transitions metal atoms from Group 4 or Group 5 of the Periodic Table, in which the atomic valency state of the transition metal atom M is divalent, trivalent or tetravalent, are more preferred, and particularly titanium, zirconium, hafnium and vanadium are preferred. When the transition metal atom M is titanium or vanadium, the atom in its trivalent state is particularly preferred.

Y represents a hydrogen atom, halogen atoms, an oxygen atom, hydrocarbon groups, oxygen-containing groups, sulfur-containing groups, nitrogen-containing groups, boron-containing groups, aluminum-containing groups, phosphorus-containing groups, halogen-containing groups, heterocyclic compound residues, silicon-containing groups and germanium-containing groups.

The letter m is a number satisfying the valency of M, and is a number which is determined by the valency of the transition metal atom M and the valency of X, and results from neutralization of the positive and negative valencies of M and X. Here, when the absolute value of the valency of the transition metal atom M is called a, and the absolute value of the valency of Y is called b, a relationship of a−2=b×m is established. More specifically, for example, when M is $Ti^{4+}$ and Y is $Cl^-$, m is 2.

When m is 2 or greater, the plurality of atoms or groups represented by Y may be identical with or different from each other, and the plurality of groups represented by Y may be bonded to each other to form a ring.

Also, when Y is an oxygen atom, M and Y are bonded by a double bond.

Furthermore, in the above general formula (9), Z represents a neutral ligand having an electron donating group, and n, which represents the number of Z units, represents an integer from 0 to 3, and preferably 1 or 2. The electron donating groups are groups having unpaired electrons that can be donated to metal, and Z may be any of neutral ligands having electron-donating ability. Specific examples of the neutral ligand Z include saturated or unsaturated ethers, which may be linear or cyclic, such as, for example, diethyl ether, dimethyl ether, diisopropyl ether, tetrahydrofuran, furan, dimethylfuran, anisole, diphenyl ether and methyl t-butyl ether; saturated or unsaturated aldehydes, which may be linear or cyclic, such as, for example, acetaldehyde, propionaldehyde, n-butylaldehyde, benzaldehyde, p-nitrobenzaldehyde, p-tolualdehyde and phenylacetaldehyde; saturated or unsaturated ketones, which may be linear or cyclic, such as, for example, acetone, methyl ethyl ketone, methyl n-propyl ketone, acetophenone, benzophenone, n-butyrophenone and benzyl methyl ketone; saturated or unsaturated amides, which may be linear or cyclic, such as, for example, formamide, acetamide, benzamide, n-valeramide, stearylamide, N,N-dimethylformamide, N,N-dimethylacetamide, N,N-diethylpropionamide and N,N-dimethyl-n-butylamide; saturated or unsaturated anhydrides, which may be linear or cyclic, such as, for example, acetic anhydride, succinic anhydride and maleic anhydride; saturated or unsaturated imides, which may be linear or cyclic, such as, for example, succinimide and phthalimide; saturated or unsaturated esters, which may be linear or cyclic, such as, for example, methyl acetate, ethyl acetate, benzyl acetate, phenyl acetate, ethyl formate, ethyl propionate, ethyl stearate and ethyl benzoate; saturated or unsaturated amines, which may be linear or cyclic, such as, for example, trimethylamine, triethylamine, triphenylamine, dimethylamine, aniline, pyrrolidine, piperidine and morpholine; nitrogen-containing heterocyclic compounds such as, for example, pyridine, α-picoline, β-picoline, quinoline, isoquinoline, 2-methylpyridine, pyrrole, oxazole, imidazole, pyrazole and indole; sulfur-containing heterocyclic compounds such as, for example, thiophene and thiazole; phosphines such as, for example, trimethylphosphine, triethylphosphine, tri-n-butylphosphine and triphenylphosphine; saturated or unsaturated nitriles such as, for example, acetonitrile and benzonitrile; inorganic salts such as, for example, lithium chloride, sodium chloride, potassium chloride, magnesium chloride and calcium chloride; inorganic compounds such as carbon monoxide and carbon dioxide; the organic metal, for example, such as compounds (D) described above. Also, Z may be compounds wherein the above mentioned compounds are partially substituted with a substituent such as, for example, an alkyl group, a halogen group, a nitro group, a carbonyl group and an amino group. For Z in the above general formula (9), among these neutral ligands, ethers, aldehydes, ketones, nitrogen-containing heterocyclic compounds and inorganic salts are preferred.

In the above general formula (9), the letter i is an integer from 1 to 3, and preferably 2 or 3. According to the invention, among the specific transition metal compounds satisfying the above-mentioned requirements, [hydrobis(3-mesitylpyrazol-1-yl)(5-mesitylpyrazol-1-yl)]borate zirconium trichloride or [hydrotris(3-mesitylpyrazol-1-yl)]borate zirconium trichloride is particularly preferred.

Moreover, the transition metal compounds may form a complex such as a dimer, a trimer, an oligomer through these neutral ligands, or may form a crosslinked structure such as, for example, a μ-oxo compound through these neutral ligands.

(Organometallic Compound (D'))

The organometallic compound (D') used in the production of the capsular fine particles comprising the olefinic polymer having Al at one end of the invention, is identical to the organometallic compound (D) used in the production of the capsular fine particles comprising the olefinic polymer described above, and particularly, a compound of the Formula (6-1) is preferred.

The capsular fine particles comprising the olefinic polymer having the functional group, which is obtained by Method 5 of the invention, can be produced by a process in which the olefin polymer having Al at one end obtained by producing in the same manner as for the capsular fine particles comprising the olefinic polymer of the invention using the polymerizing catalyst component described above, is reacted with an oxygen-containing compound, a halogen-containing compound, a nitrogen-containing compound or a sulfur-containing compound, and then the solid catalyst component forming the inner layer is removed.

The oxygen-containing compounds, which are reacted with the fine particles comprising the olefinic polymer having Al at one end, may be exemplified by oxygen, ethylene oxides and propylene oxides, and preferably oxygen may be mentioned. The reaction is performed by introducing dry oxygen or air into a slurry liquid of the fine particles comprising the olefinic polymer having Al at one end, under an inert gas atmosphere, in a hydrocarbon solvent at a temperature of ranging from 0 to 150° C. Through this reaction, an OH-terminated polyolefin can be synthesized. As the halogen-containing compounds, chlorine, bromine and iodine are used. The reaction is performed by directly introducing a halogen compound into a slurry liquid of the fine particles comprising the olefinic polymer having Al at one end, under an inert gas atmosphere, in a hydrocarbon solvent, in the presence of a base such as pyridine at a temperature of ranging from 0 to 150° C.

The capsular fine particles comprising the olefinic polymer of the invention realize, in the case where the encapsulated material is gas, whitening during light scattering and weight reduction as a material, and can be used in applications such as pigment for coating material, solvent-based coating material, powdery coating material, weight-reducing resin material and hardware for electronic books. Also, in the case where the fine particles encapsulate liquid or solid in the inside, the fine particles attain a function of releasing the material in the inner layer under certain conditions, and can be appropriately used in applications such as toner for dry process photocopiers, repellent for ants, heat storage medium, coating material, adhesive, agrochemical, feedstuff and immobilized enzyme.

EXAMPLES

Hereinafter, the present invention will be further illustrated with reference to Examples, but the invention is not limited in any way to these examples. Furthermore, measurement of the respective property values was performed on the basis of the following methods.

[Outer Diameter (L), Inner Diameter (M), Average Particle Size and Aspect Ratio of Capsular Fine Particles]

The capsular fine particles comprising the olefinic polymer were dried, and then images thereof were taken with DIGITAL HIGH DEFINITION MICROSCOPVH-7000 manufactured by Keyence Corp. The image data were subjected to two-dimensional optical image analysis using Mac-View version 3.5 manufactured by Mountech Co., Ltd., to calculate the inner diameter and outer diameter as circle equivalent diameters.

The outer diameter (L) and inner diameter (M) were determined as the respective average values of the outer diameters and inner diameters of 10 particles, which values were obtained by separately performing image analysis for the same particle based on the same image data.

The average particle size is the same as the outer diameter (L).

The aspect ratio was calculated as the ratio of the diameter of a circle circumscribing a fine particle (Le) and the diameter of a circle inscribing the fine particle (Li), (Le)/(Li), according to the same method, using two-dimensional image data and Mac-View version 3.5 manufactured by Mountech Co., Ltd.

[Intrinsic Viscosity [η]]

This is a value measured at a temperature of 135° C. using a decalin solvent. That is, about 20 mg of granulated pellets are dissolved in 15 ml of decalin, and the specific viscosity $\eta_{sp}$ is measured in an oil bath at a temperature of 135° C. 5 ml of the decalin solvent is added to this decalin solution to dilute the solution, and the specific viscosity $\eta_{sp}$ is measured in the same manner. This diluting operation is further repeated twice, and the value of $\eta_{sp}/C$, when the concentration (C) is extrapolated at 0, is determined as the intrinsic viscosity.

$$[\eta]=lim(\eta_{sp}/C)(C \rightarrow 0)$$

Synthetic Example 1

Preparation of Component (B1)

95.2 g (1.0 mole) of anhydrous magnesium chloride, 442 ml of decane and 390.6 g (3.0 moles) of 2-ethylhexyl alcohol were reacted at 130° C. for 2 hours to obtain a homogeneous solution (component (B1)).

Synthetic Example 2

Preparation of Mg-Containing Support Component (B1-1)

Into a sufficiently nitrogen-purged flask having an internal volume of 1000 ml, 100 ml (100 millimoles in terms of magnesium atoms) of the component (B1) and 350 ml of purified decane were introduced, and while maintaining the temperature of the liquid at 20° C. with stirring at a speed of rotation of 10000 rpm using Clear Mix CLM-0.8S manufactured by Organo Corp., 104 millimoles of triethylaluminum diluted in purified decane was added dropwise over 30 minutes. Thereafter, the temperature of the liquid was raised to 80° C. over 3.5 hours, and the system was allowed to react for 1 hour. Subsequently, while maintaining the temperature at 80° C., 196 millimoles of triethylaluminum diluted in purified decane was again added dropwise over 30 minutes, and then the mixture was allowed to react under heating for another 1 hour. After completion of the reaction, the mixture was filtered to collect the solids portion, which was then sufficiently washed with toluene, and 200 ml of toluene was added to the solids portion to obtain a toluene slurry of the solid catalyst component (B1-1). The average particle size of the obtained solid catalyst component was 3.5 μm.

Furthermore, a portion of the Mg-containing support component (B1-1) prepared by the above operation was dried and examined for the composition, and as a result, the composition included 19.0% by weight of magnesium, 2.6% by weight of aluminum, 17.5% by weight of 2-ethylhexoxy group, and 55.0% by weight of chlorine.

Synthetic Example 3

Preparation of Solid Catalyst Component (B1-1-A2-195)

Into a sufficiently nitrogen-purged flask having an internal volume of 1000 ml, 90 millimoles, in terms of magnesium atoms, of the Mg-containing support component (B1-1) and 645 ml of purified toluene were introduced, and while maintaining the liquid at room temperature with stirring, 20 ml of a toluene solution (0.000225 mmol/ml) of the following component (A2-195) was added dropwise over 30 minutes. After stirring for 1 hour, the mixture was filtered to collect the solids portion, which was then sufficiently washed with toluene, and purified decane was added to obtain 200 ml of a decane slurry of the solid catalyst component (B1-1-A2-195).

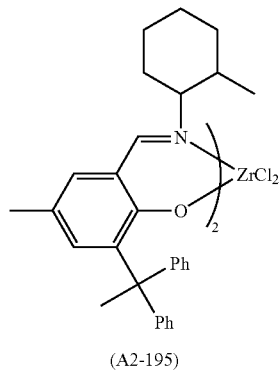

[Chem. 9]

(A2-195)

Example 1

500 ml of purified heptane was placed in a sufficiently nitrogen-purged autoclave made of SUS and having an internal volume of 1 liter, and ethylene was flowing to saturate the liquid phase and the gas phase with ethylene. Thereafter, the temperature was raised to 75° C., and under an ethylene atmosphere, 1.25 mmol of triethylaluminum and 0.001 mmol, in terms of Zr component, of the component produced above (B1-1-A2-195) were introduced. Then, the temperature was raised to 80° C. to set the ethylene pressure at 0.39 MPa·G, and polymerization was carried out for 1 hour. During the polymerization, the system was maintained at 80° C. and an ethylene pressure of 0.39 MPa·G. After completion of the polymerization, 200 ml of the product slurry was taken out under a nitrogen atmosphere, directly filtered, and re-slurried with 140 ml of isobutyl alcohol. The entirety of the slurry was transferred to a sufficiently nitrogen-purged glass reactor having an internal volume of 0.5 liters, 60 ml of acetylacetone was added, and the mixture was heated with stirring at 100° C. for 1.5 hours. Thereafter, the reaction product was filtered, washed with isobutyl alcohol, and washed with methanol and hexane. The resulting polymer was dried in a vacuum for 10 hours to obtain 19.5 g of powders.

The outer diameter and inner diameter of the particles were measured based on FIG. 1, and as a result, it was found that capsular fine particles having an outer diameter (L) of 9.14 μm and an inner diameter (M) of 3.96 μm were generated.

Therefore, the ratio (L/M) of the outer diameter (L) and the inner diameter (M) was calculated to be 2.31. The aspect ratio of these capsular fine particles was 1.05.

Synthetic Example 4

Preparation of Mg-Containing Support Component (B1-2)

Into a sufficiently nitrogen-purged flask having an internal volume of 1000 ml, 50 ml (50 millimoles in terms of magnesium atoms) of the component (B1), 283 ml of purified decane and 117 ml of chlorobenzene were introduced, and while maintaining the temperature of the liquid at 0° C. with stirring at a speed of rotation of 15000 rpm using Clear Mix CLM-0.8S manufactured by Organo Corp., 52 millimoles of triethylaluminum diluted in purified decane was added dropwise over 30 minutes. Then the liquid temperature was raised to 80° C. over 5 hours and allowed to react for 1 hour. Subsequently, while maintaining the temperature at 80° C., 98 millimoles of triethylaluminum diluted in purified decane was again added dropwise over 30 minutes, and then the mixture was allowed to react under heating for another 1 hour. After completion of the reaction, the mixture was filtered to collect the solids portion, which was then sufficiently washed with toluene, and 100 ml of toluene was added to the solids portion to obtain a toluene slurry of the Mg-containing support component (B1-2). The average particle size of the resulting Mg-containing support component (B1-2) was 1.5 μm.

Furthermore, a portion of the Mg-containing support component (B1-2) prepared by the above operation was dried and examined for the composition, and as a result, the composition included 19.0% by weight of magnesium, 2.9% by weight of aluminum, 21.0% by weight of 2-ethylhexoxy group, and 53.0% by weight of chlorine. The molar ratio of magnesium and aluminum (Mg/Al) was 7.3, and the molar ratio of 2-ethylhexoxy group and aluminum (2-ethylhexoxy group/Al) was 1.5.

Synthetic Example 5

Preparation of Solid Catalyst Component (B1-1-A2-361)

Into a sufficiently nitrogen-purged flask having an internal volume of 200 ml, 20 millimoles (40 ml), in terms of magnesium atoms, of the Mg-containing support component (B1-1), and 50 ml of purified toluene were introduced, and while maintaining the liquid at room temperature with stirring, 10.0 ml of a toluene solution (0.00005 mmol/ml) of the following component (A2-361) was added dropwise over 10 minutes. After stirring for 1 hour, the mixture was filtered to collect the solids portion, which was then sufficiently washed with toluene, and purified decane was added to obtain 100 ml of a decane slurry of the solid catalyst component (B1-1-A2-361).

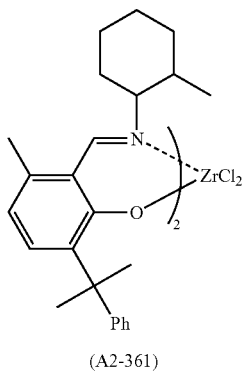

(A2-361)

Synthetic Example 6

Preparation of Solid Catalyst Component
(B1-2-A2-361)

Into a sufficiently nitrogen-purged flask having an internal volume of 200 ml, 20 millimoles (40 ml), in terms of magnesium atoms, of the Mg-containing support component (B1-2), and 50 ml of purified toluene were introduced, and while maintaining the liquid at room temperature with stirring, 10.0 ml of a toluene solution (0.00005 mmol/ml) of the following component (A2-361) was added dropwise over 10 minutes. After stirring for 1 hour, the mixture was filtered to collect the solids portion, which was then sufficiently washed with toluene, and purified decane was added to obtain 100 ml of a decane slurry of the solid catalyst component (B1-2-A2-361).

Synthetic Example 7

Preparation of Solid Catalyst Component
(B1-1-A2-126)

Into a sufficiently nitrogen-purged flask having an internal volume of 200 ml, 20 millimoles (40 ml), in terms of magnesium atoms, of the Mg-containing support component (B1-1), and 50 ml of purified toluene were introduced, and while maintaining the liquid at room temperature with stirring, 10.0 ml of a toluene solution (0.0002 mmol/ml) of the following component (A2-361) was added dropwise over 10 minutes. After stirring for 1 hour, the mixture was filtered to collect the solids portion, which was then sufficiently washed with toluene, and purified decane was added to obtain 100 ml of a decane slurry of the solid catalyst component (B1-1-A2-126).

Synthetic Example 8

Preparation of Solid Catalyst Component
(B1-1-A2-126/361)

Into a sufficiently nitrogen-purged flask having an internal volume of 200 ml, 20 millimoles (40 ml), in terms of magnesium atoms, of the Mg-containing support component (B1-1), and 50 ml of purified toluene were introduced, and while maintaining the liquid at room temperature with stirring, mixed solution of 5.0 ml of a toluene solution (0.00005 mmol/ml) of the component (A2-361) and 5.0 ml of a toluene solution (0.0002 mmol/ml) of the component (A2-126) was added dropwise over 10 minutes. After stirring for 1 hour, the mixture was filtered to collect the solids portion, which was then sufficiently washed with toluene, and purified decane was added to obtain 100 ml of a decane slurry of the solid catalyst component (B1-1-A2-126/361).

Synthetic Example 9

Preparation of Solid Catalyst Component
(B1-1-A1-TiCl$_4$

Into a sufficiently nitrogen-purged glass vessel having an internal volume of 30 ml, 15.0 ml of purified toluene, 2.1 millimoles (4.2 ml), in terms of magnesium atoms, of the Mg-containing support component (B1-2), and 0.14 mmol (0.14 ml) of a toluene solution of TiCl$_4$ were added, and the mixture was stirred for 15 minutes to prepare a solid catalyst component (B1-1-A1-TiCl$_4$).

Synthetic Example 10

Preparation of Solid Catalyst Component
(B1-1-A2-138)

Into a sufficiently nitrogen-purged flask having an internal volume of 200 ml, 5 millimoles (10 ml), in terms of magnesium atoms, of the Mg-containing support component (B1-1), and 80 ml of purified toluene were introduced, and while maintaining the liquid at room temperature with stirring, 10.0 ml of a toluene solution (0.0003 mmol/ml) of the following component (A2-138) was added dropwise over 10 minutes. After stirring for 1 hour, the mixture was filtered to collect the solids portion, which was then sufficiently washed with toluene, and purified decane was added to obtain 100 ml of a decane slurry of the solid catalyst component (B1-1-A2-138).

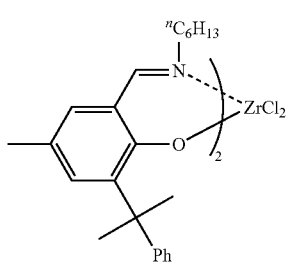

(A2-126)

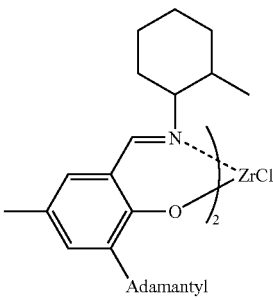

(A2-138)

Example 2

500 ml of purified heptane was placed in a sufficiently nitrogen-purged autoclave made of SUS and having an internal volume of 1 liter, and ethylene was flown in to saturate the liquid phase and the gas phase with ethylene. Thereafter, the temperature was raised to 60° C., and under an ethylene atmosphere, 0.5 mmol of triethylaluminum, 81 mg of Emulgen 108 (Kao Corp.), and 30.0 ml (in terms of Zr: 0.00015 mmol) of a slurry of the component (B1-1-A2-361) prepared above were introduced. Then, the ethylene pressure was raised up to 0.8 MPa·G over 10 minutes, and then polymerization was carried out for 30 minutes. After completion of the polymerization, the product slurry was filtered, and then transferred to a 300-ml glass reactor to re-slurry the product with 150 ml of isobutyl alcohol and 50 ml of acetylacetone. The slurry was stirred with heating at 100° C. for 1 hour. Thereafter, the reaction product was filtered, washed with isobutyl alcohol, and then washed with methanol and acetone. The resulting polymer was dried in a vacuum for 10 hours to obtain 24.55 g of powders. The vinyl content in the polymer as measured by the infrared absorption spectroscopic method was 0.03 units/1000 carbon atoms, and the intrinsic viscosity [η] was 21.2 dl/g.

The outer diameter and inner diameter of the particles were measured, and as a result, it was found that capsular fine particles having an outer diameter (L) of 11.36 μm and an inner diameter (M) of 4.92 μm were generated.

Therefore, the ratio (L/M) of the outer diameter (L) and the inner diameter (M) was calculated to be 2.31. The aspect ratio of these capsular fine particles was 1.05.

Example 3

500 ml of purified heptane was placed in a sufficiently nitrogen-purged autoclave made of SUS and having an internal volume of 1 liter, and ethylene was flown in to saturate the liquid phase and the gas phase with ethylene. Thereafter, the temperature was raised to 60° C., and under an ethylene atmosphere, 0.5 mmol of triethylaluminum, 27 mg of Emulgen 108 (Kao Corp.), and 10.0 ml (in terms of Zr: 0.00005 mmol) of a slurry of the component (B1-1-A2-361) prepared above were introduced. Then, the ethylene pressure was raised up to 0.8 MPa·G over 10 minutes, and then polymerization was carried out for 90 minutes. After completion of the polymerization, the product slurry was filtered, and then transferred to a 300-ml glass reactor to re-slurry the product with 150 ml of isobutyl alcohol and 50 ml of acetylacetone. The slurry was stirred with heating at 100° C. for 1 hour. Thereafter, the reaction product was filtered, washed with isobutyl alcohol, and then washed with methanol and acetone. The resulting polymer was dried in a vacuum for 10 hours to obtain 17.10 g of powders. The vinyl content in the polymer as measured by the infrared absorption spectroscopic method was 0.03 units/1000 carbon atoms, and the intrinsic viscosity [η] was 25.0 dl/g.

The outer diameter and inner diameter of the particles were measured, and as a result, it was found that capsular fine particles having an outer diameter (L) of 13.99 μm and an inner diameter (M) of 6.17 μm were generated.

Therefore, the ratio (L/M) of the outer diameter (L) and the inner diameter (M) was calculated to be 2.27. The aspect ratio of these capsular fine particles was 1.11.

Example 4

400 ml of purified decane was placed in a sufficiently nitrogen-purged glass reactor having an internal volume of 0.5 liters and equipped with a stirring blade, and ethylene gas was flowing at a rate of 100 L/H to saturate the liquid phase and the gas phase with ethylene. Thereafter, the temperature was raised to 60° C., and under an ethylene atmosphere, 0.5 mmol of triethylaluminum, and 10.0 ml (in terms of Zr: 0.00005 mmol) of a slurry of the component (B1-1-A2-361) prepared above were introduced. Then, while maintaining the ethylene gas flowing, polymerization was carried out for 40 minutes. After completion of the polymerization, the product slurry was filtered, and then transferred to a 200-ml glass reactor to re-slurry the product with 75 ml of isobutyl alcohol and 25 ml of acetylacetone. The slurry was stirred with heating at 100° C. for 1 hour. Thereafter, the reaction product was filtered, washed with isobutyl alcohol, and then washed with methanol and acetone. The resulting polymer was dried in a vacuum for 10 hours to obtain 1.60 g of powders. The vinyl content in the polymer as measured by the infrared absorption spectroscopic method was 0.02 units/1000 carbon atoms, and the intrinsic viscosity [η] was 8.32 dl/g.

The outer diameter and inner diameter of the particles were measured, and as a result, it was found that capsular fine particles having an outer diameter (L) of 5.98 μm and an inner diameter (M) of 2.68 μm were generated.

Therefore, the ratio (L/M) of the outer diameter (L) and the inner diameter (M) was calculated to be 2.23. The aspect ratio of these capsular fine particles was 1.04.

Example 5

500 ml of purified heptane was placed in a sufficiently nitrogen-purged autoclave made of SUS and having an internal volume of 1 liter, and ethylene was flowing to saturate the liquid phase and the gas phase with ethylene. Thereafter, the temperature was raised to 60° C., and under an ethylene atmosphere, 0.5 mmol of triethylaluminum, 27 mg of Emulgen 108 (Kao Corp.), and 10.0 ml (in terms of Zr: 0.00005 mmol) of a slurry of the component (B1-2-A2-361) prepared above were introduced. Then, the ethylene pressure was raised up to 0.8 MPa·G over 10 minutes, and then polymerization was carried out for 60 minutes. After completion of the polymerization, the product slurry was filtered, and then transferred to a 300-ml glass reactor to re-slurry the product with 150 ml of isobutyl alcohol and 50 ml of acetylacetone. The slurry was stirred with heating at 100° C. for 1 hour. Thereafter, the reaction product was filtered, washed with isobutyl alcohol, and then washed with methanol and acetone. The resulting polymer was dried in a vacuum for 10 hours to obtain 10.745 g of powders. The vinyl content in the polymer as measured by the infrared absorption spectroscopic method was 0.03 units/1000 carbon atoms, and the intrinsic viscosity [η] was 22.7 dl/g.

The outer diameter and inner diameter of the particles were measured, and as a result, it was found that capsular fine particles having an outer diameter (L) of 6.30 μm and an inner diameter (M) of 3.43 μm were generated.

Therefore, the ratio (L/M) of the outer diameter (L) and the inner diameter (M) was calculated to be 1.84. The aspect ratio of these capsular fine particles was 1.02.

Example 6

Polymerization and treatment were performed in the same manner as in Example 4, except that a slurry of (B1-2-A2-361) was used instead of (B1-1-A2-361) as the solid catalyst component, thus to obtain 1.83 g of powders. The vinyl content in the polymer as measured by the infrared absorption spectroscopic method was 0.02 units/1000 carbon atoms, and the intrinsic viscosity [η] was 6.91 dl/g.

The outer diameter and inner diameter of the particles were measured, and as a result, it was found that capsular fine particles having an outer diameter (L) of 4.06 μm and an inner diameter (M) of 1.68 μm were generated.

Therefore, the ratio (L/M) of the outer diameter (L) and the inner diameter (M) was calculated to be 2.42. The aspect ratio of these capsular fine particles was 1.03.

Example 7

500 ml of purified heptane was placed in a sufficiently nitrogen-purged autoclave made of SUS and having an internal volume of 1 liter, and ethylene was flowing to saturate the liquid phase and the gas phase with ethylene. Thereafter, the temperature was raised to 50° C., and under an ethylene atmosphere, 0.5 mmol of trioctylaluminum, 27 mg of Emulgen 108 (Kao Corp.), and 10.0 ml (in terms of Zr: 0.001 mmol) of a slurry of the component (B1-1-A2-126) prepared above were introduced. Then, the ethylene pressure was raised up to 0.8 MPa·G over 10 minutes, and then polymerization was carried out for 60 minutes. After completion of the polymerization, the product slurry was filtered, and then transferred to a 300-ml glass reactor to re-slurry the product with 150 ml of isobutyl alcohol and 50 ml of acetylacetone. The slurry was stirred with heating at 90° C. for 1 hour. Thereafter, the reaction product was filtered, washed with isobutyl alcohol, and then washed with methanol and acetone. The resulting polymer was dried in a vacuum for 10 hours to obtain 8.62 g of powders. The vinyl content in the polymer as measured by the infrared absorption spectroscopic method was 1.53 units/1000 carbon atoms, and the intrinsic viscosity [η] was 1.55 dl/g.

The outer diameter and inner diameter of the particles were measured, and as a result, it was found that capsular fine particles having an outer diameter (L) of 11.51 μm and an inner diameter (M) of 5.50 μm were generated.

Therefore, the ratio (L/M) of the outer diameter (L) and the inner diameter (M) was calculated to be 2.09. The aspect ratio of these capsular fine particles was 1.09.

Example 8

400 ml of purified decane was placed in a sufficiently nitrogen-purged glass reactor having an internal volume of 0.5 liters and equipped with a stirring blade, and ethylene gas was flowing at a rate of 100 L/H to saturate the liquid phase and the gas phase with ethylene. Thereafter, the temperature was raised to 50° C., and in an ethylene atmosphere, 0.5 mmol of triethylaluminum, and 10.0 ml (in terms of Zr: 0.001 mmol) of a slurry of the component (B1-1-A2-126) prepared above were introduced. Then, while maintaining the ethylene gas flowing, polymerization was carried out for 15 minutes. After completion of the polymerization, the product slurry was filtered, and then transferred to a 200-ml glass reactor to re-slurry the product with 75 ml of isobutyl alcohol and 25 ml of acetylacetone. The slurry was stirred with heating at 100° C. for 1 hour. Thereafter, the reaction product was filtered, washed with isobutyl alcohol, and then washed with methanol and acetone. The resulting polymer was dried in a vacuum for 10 hours to obtain 1.77 g of powders. The vinyl content in the polymer as measured by the infrared absorption spectroscopic method was 1.78 units/1000 carbon atoms, and the intrinsic viscosity [η] was 0.65 dl/g.

The outer diameter and inner diameter of the particles were measured, and as a result, it was found that capsular fine particles having an outer diameter (L) of 6.81 μm and an inner diameter (M) of 3.79 μm were generated.

Therefore, the ratio (L/M) of the outer diameter (L) and the inner diameter (M) was calculated to be 1.80. The aspect ratio of these capsular fine particles was 1.08.

Example 9

500 ml of purified heptane was placed in a sufficiently nitrogen-purged autoclave made of SUS and having an internal volume of 1 liter, and ethylene was flowing to saturate the liquid phase and the gas phase with ethylene. Thereafter, the temperature was raised to 50° C., and under an ethylene atmosphere, 1.0 mmol of triethylaluminum, 27 mg of Emulgen 108 (Kao Corp.), and 10.0 ml (in terms of Zr: 0.000125 mmol) of a slurry of the component (B1-1-A2-126/361) prepared above were introduced. Then, the ethylene pressure was raised up to 0.8 MPa·G over 10 minutes, and then polymerization was carried out for 60 minutes. After completion of the polymerization, the product slurry was filtered, and then transferred to a 300-ml glass reactor to re-slurry the product with 150 ml of isobutyl alcohol and 50 ml of acetylacetone. The slurry was stirred with heating at 100° C. for 1 hour. Thereafter, the reaction product was filtered, washed with isobutyl alcohol, and then washed with methanol and acetone. The resulting polymer was dried in a vacuum for 10 hours to obtain 6.60 g of powders. The vinyl content in the polymer as measured by the infrared absorption spectroscopic method was 0.32 units/1000 carbon atoms, and the intrinsic viscosity [η] was 20.6 dl/g.

The outer diameter and inner diameter of the particles were measured, and as a result, it was found that capsular fine particles having an outer diameter (L) of 16.43 μm and an inner diameter (M) of 6.00 μm were generated.

Therefore, the ratio (L/M) of the outer diameter (L) and the inner diameter (M) was calculated to be 2.74. The aspect ratio of these capsular fine particles was 1.06.

Example 10

400 ml of purified decane was placed in a sufficiently nitrogen-purged glass reactor having an internal volume of 0.5 liters and equipped with a stirring blade, and ethylene gas was flowing at a rate of 100 L/H to saturate the liquid phase and the gas phase with ethylene. Thereafter, the temperature was raised to 50° C., and under an ethylene atmosphere, 1.0 mmol of triethylaluminum, and 10.0 ml (in terms of Zr: 0.000125 mmol) of a slurry of the component (B1-1-A2-126/361) prepared above were introduced. Then, while maintaining the ethylene gas flowing, polymerization was carried out for 60 minutes. After completion of the polymerization, the product slurry was filtered, and then transferred to a 200-ml glass reactor to re-slurry the product with 75 ml of isobutyl alcohol and 25 ml of acetylacetone. The slurry was stirred with heating at 100° C. for 1 hour. Thereafter, the reaction product was filtered, washed with isobutyl alcohol, and then washed with methanol and acetone. The resulting polymer was dried in a vacuum for 10 hours to obtain 1.30 g of powders. The vinyl content in the polymer as measured by the infrared absorption spectroscopic method was 0.71 units/1000 carbon atoms, and the intrinsic viscosity [η] was 7.06 dl/g.

The outer diameter and inner diameter of the particles were measured, and as a result, it was found that capsular fine particles having an outer diameter (L) of 10.36 μm and an inner diameter (M) of 3.28 μm were generated.

Therefore, the ratio (L/M) of the outer diameter (L) and the inner diameter (M) was calculated to be 3.16. The aspect ratio of these capsular fine particles was 1.05.

Example 11

500 ml of purified heptane was placed in a sufficiently nitrogen-purged autoclave made of SUS and having an internal volume of 1 liter, and ethylene was flowing to saturate the liquid phase and the gas phase with ethylene. Thereafter, the temperature was raised to 50° C., and under an ethylene atmosphere, 1.0 mmol of triisobutylaluminum, and 0.05 ml (in terms of Ti: 0.0073 mmol) of a slurry of the component (B1-1-TiCl$_4$) prepared above were introduced. While flowing in ethylene at a rate of 100 L/h at normal pressure, polymerization was carried out for 5 minutes. After completion of the polymerization, the product slurry was filtered, and then transferred to a 200-ml glass reactor to re-slurry the product slurry with 75 ml of isobutyl alcohol and 25 ml of acetylacetone. The slurry was stirred with heating at 100° C. for 1 hour. Thereafter, the reaction product was filtered, washed with isobutyl alcohol, and then washed with methanol and acetone. The resulting polymer was dried in a vacuum for 10 hours to obtain 4.19 g of powders. The vinyl content in the polymer as measured by the infrared absorption spectroscopic method was 0.02 units/1000 carbon atoms, and the intrinsic viscosity [η] was 19.3 dl/g.

The outer diameter and inner diameter of the particles were measured, and as a result, it was found that capsular fine particles having an outer diameter (L) of 4.89 μm and an inner diameter (M) of 1.99 μm were generated.

Therefore, the ratio (L/M) of the outer diameter (L) and the inner diameter (M) was calculated to be 2.46. The aspect ratio of these capsular fine particles was 1.11.

Example 12

250 ml of purified decane was placed in a sufficiently nitrogen-purged glass reactor having an internal volume of 0.5 liters and equipped with a stirring blade, and ethylene gas was flowing at a rate of 100 L/H to saturate the liquid phase and the gas phase with ethylene. Thereafter, the temperature was raised to 60° C., and under an ethylene atmosphere, 2.0 mmol of triethylaluminum, and 10.0 ml (in terms of Zr: 0.0003 mmol) of a slurry of the component (B1-1-A2-138) prepared above were introduced. Then, while maintaining the ethylene gas flowing, polymerization was carried out for 15 minutes. After completion of the polymerization, the product slurry was filtered through a glass filter under a nitrogen atmosphere, and then transferred to a 200-ml glass reactor. 80 ml of purified toluene was added, and dry air was flowing at a rate of 100 L/h for 4 hours at 60° C. After completion of the reaction, the product slurry was filtered through a glass filter, subsequently filtered through a 200-ml glass filter, and was re-slurried with 75 ml of isobutyl alcohol and 25 ml of acetylacetone. The slurry was stirred with heating at 100° C. for 1 hour. Thereafter, the reaction product was filtered, washed with isobutyl alcohol, and then washed with methanol and acetone. The resulting polymer was dried in a vacuum for 10 hours to obtain 1.60 g of powders.

Subsequently, the infrared absorption spectrum of the obtained powder was measured, and absorption due to a hydroxyl group in the polymer was confirmed.

The intrinsic viscosity [η] was 5.72 dl/g.

The outer diameter and inner diameter of the particles were measured, and as a result, it was found that capsular fine particles having an outer diameter (L) of 13.90 μm and an inner diameter (M) of 6.05 μm were generated.

Therefore, the ratio (L/M) of the outer diameter (L) and the inner diameter (M) was calculated to be 2.30. The aspect ratio of these capsular fine particles was 1.12.

Example 13

Into a nitrogen-purged 300-ml glass flask, 5.03 g of the vinyl group-containing polymer obtained in Example 7, 75 ml of methylene chloride and 25 ml of a saturated aqueous solution of sodium hydrogen carbonate were introduced, and while stirring, perbenzoic acid (70% hydrated product, 3.00 g) was added thereto to initiate a reaction. As is, under a nitrogen atmosphere, the reaction was continued for 94 hours at room temperature. Thereafter, the reaction product slurry was filtered, and 30 ml of a saturated aqueous solution of sodium thiosulfate was added to the filtration product. The mixture was stirred and then filtered. 50 ml of a mixed solution of water-methanol (1/1) was added again, and the mixture was stirred and then filtered. The filtration product was washed with 50 ml of acetone and filtered twice respectively, and then dried under reduced pressure at 80° C. for 10 hours, thus to obtain 4.90 of a polymer. The vinyl content in the polymer as measured by the infrared absorption spectroscopic method was 0.90 units/1000 carbon atoms, and absorption due to an epoxy group was observed at 848 cm$^{-1}$ and a range of from 1050 to 1200 cm$^{-1}$. The content of the epoxy group as a calibrated amount was 0.4 units/1000 carbon atoms.

Example 14

Into a nitrogen-purged 200-ml glass flask, 600 mg of the epoxy product obtained in Example 13, and 25 ml of Jeffamine D400 (having approximate molecular weight of 400 and 5 to 6 PPG units and manufactured by SanTechno Chemicals Co., Ltd.) were introduced, and the mixture was stirred at 80° C. for 10 hours. After lowering the temperature, the mixture was filtered and washed three times with 50 ml of methanol. The resulting product was dried under reduced pressure at 80° C. for 10 hours to obtain 585 mg of a polymer. As a result of an analysis by the infrared absorption spectroscopic method, strong absorption due to the PPG group was observed at a range of from 1050 to 1200 cm$^{-1}$, and the absorption due to an epoxy group at 848 cm$^{-1}$ had been lost. The content of the PPG group as a calibrated amount was 0.2 units/1000 carbon atoms.

Example 15

3.0 g of the polymer obtained in Example 2 was dispersed on a circular plate made of SUS, and was irradiated with UV for 30 minutes in an ultraviolet (UV) ozone generator. After the reaction, the polymer was subjected to a measurement by the infrared absorption spectroscopic method to observe absorption due to a carbonyl group at a range of from 1680 to 1740 cm$^{-1}$.

Example 16

3.0 g of the polymer obtained in Example 5 was irradiated with UV in the same manner as in Example 15. The polymer was subjected to a measurement by the infrared absorption spectroscopic method to observe absorption due to a carbonyl group at a range of from 1680 to 1740 cm$^{-1}$.

Example 17

Figure 2:
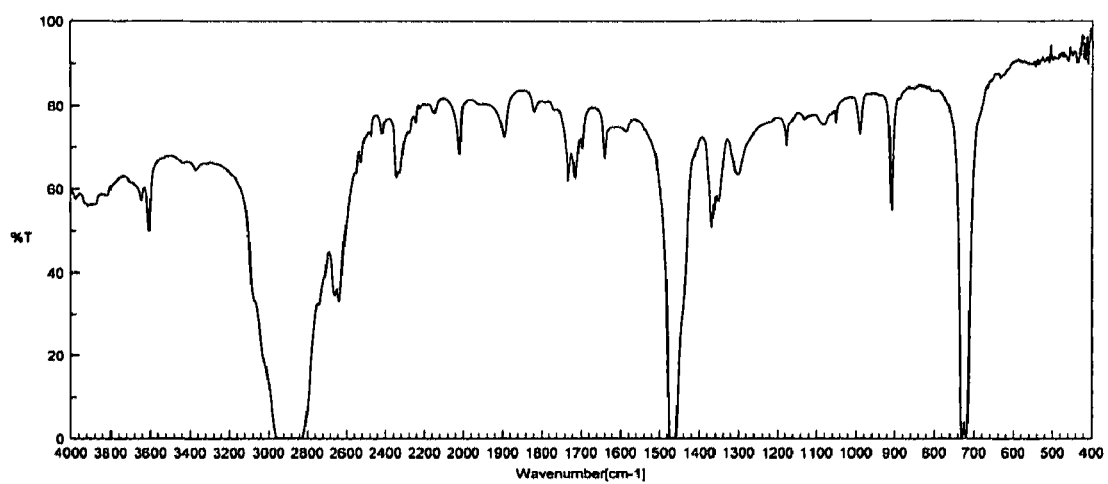
FIG. 2 shows an IR chart of the polymer of Example 17 obtained by performing UV irradiation.

3.0 g of the polymer obtained in Example 7 was dispersed on a circular plate made of SUS, and was irradiated with UV for 50 minutes in a UV ozone generator. After the reaction, the polymer was subjected to a measurement by the infrared absorption spectroscopic method to observe absorption due to a carbonyl group at a range of from 1680 to 1740 cm$^{-1}$. The vinyl content determined from the IR chart [FIG. 2] was 1.11 units/1000 carbon atoms.

Example 18

Figure 3:
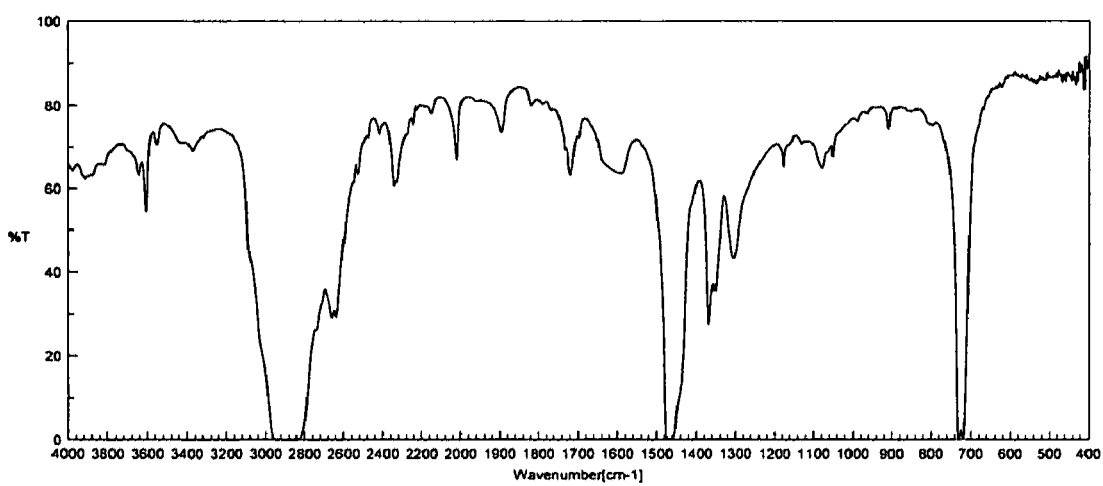
FIG. 3 shows an IR chart of the polymer of Example 18 obtained by performing UV irradiation.

3.0 g of the polymer obtained in Example 9 was dispersed on a circular plate made of SUS, and was irradiated with UV for 50 minutes in a UV ozone generator. After the reaction, the polymer was subjected to a measurement by the infrared absorption spectroscopic method to observe absorption due to a carbonyl group at a range of from 1680 to 1740 cm$^{-1}$. The vinyl content determined from the IR chart [FIG. 3] was 0.18 units/1000 carbon atoms.

INDUSTRIAL APPLICABILITY

The capsular fine particles comprising the polyolefin provided by the present invention exhibit heat resistance, abrasion resistance, solvent resistance and high crystallinity, which properties have not been recognized in the conventional capsular fine particulate materials, and thus have a potential for application to various new high performance materials.

The invention claimed is:

1. Capsular fine particles consisting of an encapsulated material selected from the group consisting of a gas, a liquid, a solid inorganic material and solid organic material, and an olefinic polymer wherein the olefinic polymer is a homopolymer or copolymer of at least one or more monomers selected from the group consisting of linear or branched α-olefins having 2 to 6 carbon atoms, wherein the olefinic polymer is a homopolymer of a single olefinic monomer selected from the group consisting of ethylene, propylene, 1-butene, 3-methyl-1-butene and 4-methyl-1-pentene; or a copolymer containing 0.01 to 10% by mole of another olefinic monomer selected from the group consisting of ethylene, propylene, 1-butene, 3-methyl-1-butene, and 4-methyl-1-pentene.

2. The capsular fine particles according to claim 1, wherein the ratio (L/M) of the outer diameter (L) and the inner diameter (M) of the particles is from 1.1 to 6.0, and the average particle size is from 0.6 to 40 μm.

3. The capsular fine particles according to claim 2, wherein the olefinic polymer has at least one functional group selected from the group consisting of vinyl groups, vinylene groups, vinylidene groups, oxygen-containing groups, nitrogen-containing groups, boron-containing groups, sulfur-containing groups, phosphorus-containing groups, silicon-containing groups, germanium-containing groups, halogen-containing groups and tin-containing groups, and the infrared absorption spectrum of the olefinic polymer obtained after methanol treatment is substantially identical to the infrared absorption spectrum of the olefinic polymer obtained before methanol treatment.

4. The capsular fine particles according to claim 3, wherein the number of the functional groups in the olefinic polymer is 0.01 to 20 per 1000 carbon atoms of the polymer.

5. The capsular fine particles according to claim 2, wherein the aspect ratio is 1.00 to 1.15.

* * * * *